(12) United States Patent
Rohan

(10) Patent No.: US 11,501,504 B2
(45) Date of Patent: Nov. 15, 2022

(54) METHOD AND APPARATUS FOR AUGMENTED REALITY

(71) Applicant: Samsung Electronics Co., Ltd., Suwon-si (KR)

(72) Inventor: Devesh Rohan, Noida (IN)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/415,336

(22) PCT Filed: Dec. 20, 2019

(86) PCT No.: PCT/KR2019/018188
§ 371 (c)(1),
(2) Date: Jun. 17, 2021

(87) PCT Pub. No.: WO2020/130708
PCT Pub. Date: Jun. 25, 2020

(65) Prior Publication Data
US 2022/0058879 A1    Feb. 24, 2022

(30) Foreign Application Priority Data
Dec. 20, 2018 (IN) .............................. 201811048302

(51) Int. Cl.
*G06T 19/00* (2011.01)
*G06F 40/30* (2020.01)
(Continued)

(52) U.S. Cl.
CPC ............ *G06T 19/006* (2013.01); *G06F 3/011* (2013.01); *G06F 3/017* (2013.01); *G06F 40/30* (2020.01);
(Continued)

(58) Field of Classification Search
CPC ......... G06T 19/006; G06T 7/70; G06F 40/30; G06F 3/011; G06F 3/017; G06V 30/36; G06V 20/62; G06V 30/10
See application file for complete search history.

(56) References Cited

U.S. PATENT DOCUMENTS 7,639,387 B2    12/2009 Hull et al.
8,209,183 B1     6/2012 Patel et al.
(Continued)

FOREIGN PATENT DOCUMENTS

CN    101836206 A    9/2010
CN    104751688 A    7/2015
(Continued)

OTHER PUBLICATIONS

Indian Office Action dated Aug. 9, 2021, issued in Indian Application No. 201811048302.
(Continued)

*Primary Examiner* — Lixi C Simpson
(74) *Attorney, Agent, or Firm* — Jefferson IP Law, LLP

(57) ABSTRACT

The disclosure provides an augmented reality system (200) including an input unit (204), a text recognition unit (206), a natural language processing unit (208), a positioning unit (210), and an output unit (212). The input unit (204) captures an image. The text recognition unit (206) identifies an information on a surface depicted in the image and generates an input data based on the information. The natural language processing unit (208) determines a context of the input data and generates at least one assistive information based on the context. The positioning unit (210) determines one or more spatial attributes based on the image and generates a positioning information based on the spatial attributes. The output unit (212) displays the assistive information based on the positioning information.

20 Claims, 25 Drawing Sheets

1100 a) Highlight : strikethrough
Display : 3D text b) Highlight : Color change
Display : On another device c) Highlight : Underlining
Display : Overlay on surface d) Highlight : Encircling
Display : 2D text

(51) Int. Cl.
*G06T 7/70* (2017.01)
*G06K 9/32* (2006.01)
*G06K 9/00* (2022.01)
*G06F 3/01* (2006.01)
*G06V 20/20* (2022.01)
*G06V 30/32* (2022.01)
*G06V 20/62* (2022.01)
*G06V 30/10* (2022.01)

(52) U.S. Cl.
CPC ............. *G06T 7/70* (2017.01); *G06V 20/20* (2022.01); *G06V 20/62* (2022.01); *G06V 30/36* (2022.01); *G06V 30/10* (2022.01)

(56) References Cited

U.S. PATENT DOCUMENTS

| | | | |
|---|---|---|---|
| 9,182,815 | B2 | 11/2015 | Small et al. |
| 9,384,389 | B1* | 7/2016 | Sankaranarayanan ................. G06V 30/262 |
| 9,524,036 | B1 | 12/2016 | Cassidy et al. |
| 9,876,916 | B1* | 1/2018 | Casio ................ G06V 30/1985 |
| 10,783,323 | B1* | 9/2020 | Hawkes ................ G16H 10/60 |
| 2005/0179617 | A1 | 8/2005 | Matsui et al. |
| 2009/0195656 | A1 | 8/2009 | Zhou et al. |
| 2011/0201387 | A1 | 8/2011 | Paek et al. |
| 2013/0222381 | A1 | 8/2013 | Di Censo et al. |
| 2013/0289976 | A1 | 10/2013 | Walker et al. |
| 2013/0293577 | A1 | 11/2013 | Perez et al. |
| 2014/0104175 | A1 | 4/2014 | Ouyang et al. |
| 2014/0310595 | A1 | 10/2014 | Acharya et al. |
| 2015/0084855 | A1* | 3/2015 | Song ...................... G06F 3/013 345/156 |
| 2016/0004692 | A1 | 1/2016 | Rogowski et al. |
| 2016/0179941 | A1 | 6/2016 | Vanblon et al. |
| 2016/0247323 | A1 | 8/2016 | Shimazaki |
| 2016/0371250 | A1 | 12/2016 | Rhodes |
| 2016/0378861 | A1 | 12/2016 | Eledath et al. |
| 2017/0124389 | A1 | 5/2017 | Park et al. |
| 2017/0344530 | A1 | 11/2017 | Krasadakis |
| 2018/0341635 | A1* | 11/2018 | Brugler ................ G06F 40/232 |
| 2019/0087653 | A1* | 3/2019 | Resendez Rodriguez ................... G06T 11/001 |
| 2020/0143773 | A1* | 5/2020 | Tholfsen ................ G09G 5/22 |

FOREIGN PATENT DOCUMENTS

| | | |
|---|---|---|
| JP | 2016-14977 A | 1/2016 |
| JP | 2016-158108 A | 9/2016 |
| JP | 2017-183937 A | 10/2017 |
| JP | 6317772 B2 | 4/2018 |
| KR | 10-2011-0024880 A | 3/2011 |
| KR | 10-2015-0033204 A | 4/2015 |
| KR | 10-1865362 B1 | 6/2018 |
| WO | 2010/020085 A1 | 2/2010 |

OTHER PUBLICATIONS

European Search Report dated Dec. 8, 2021, issued in European Application No. 19900042.3.

* cited by examiner

[Fig. 6]
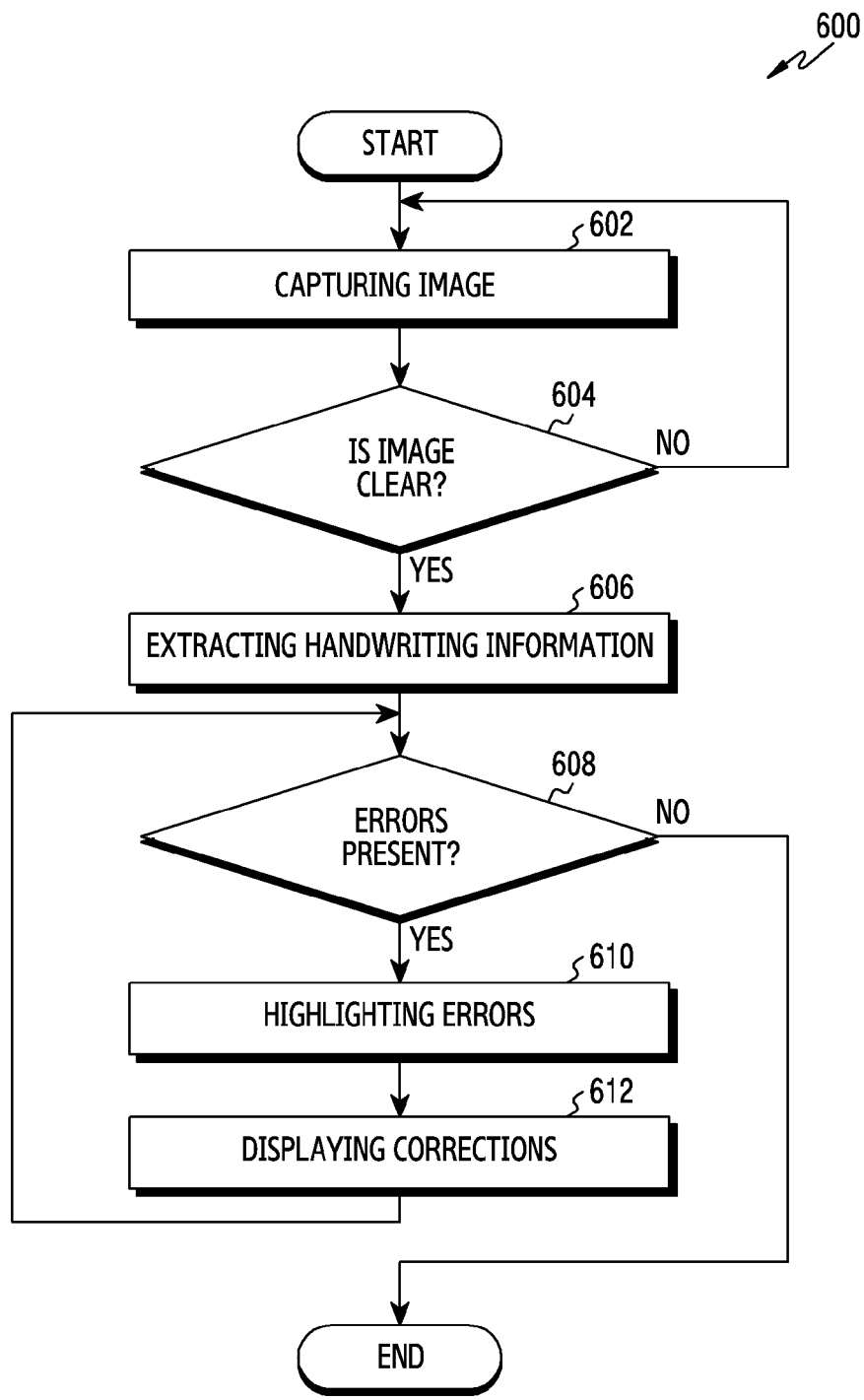

[Fig. 7]
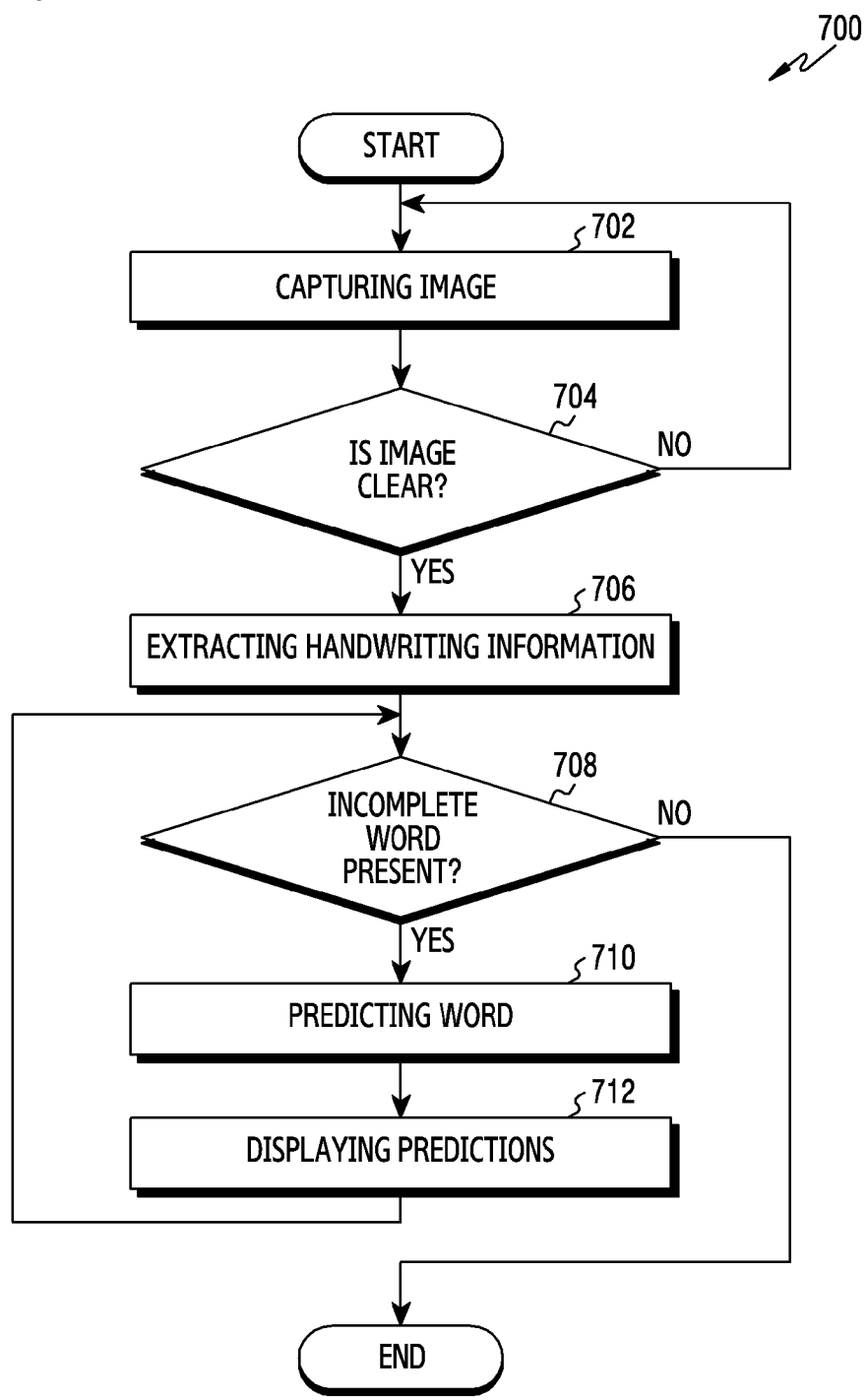

[Fig. 8]
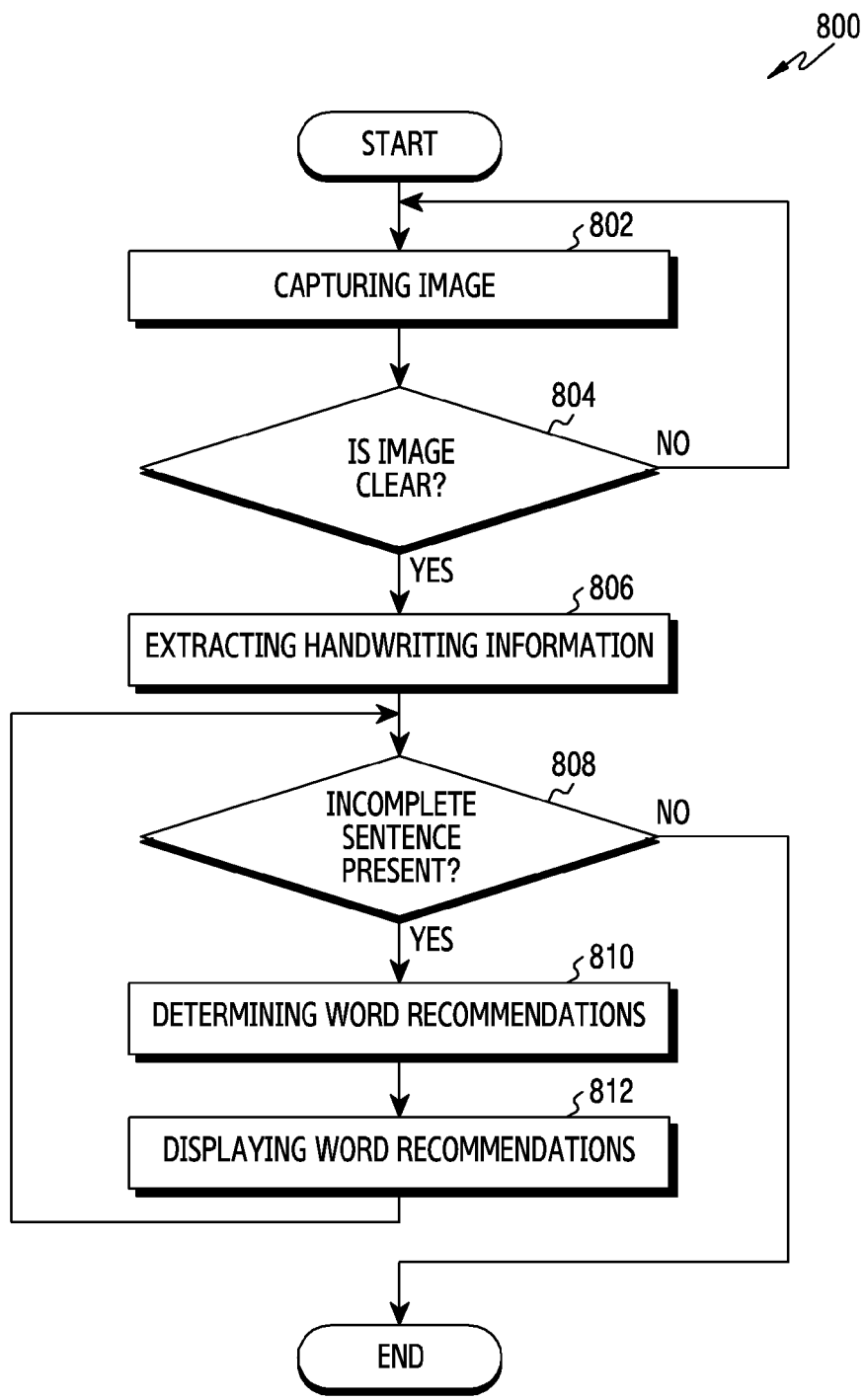

[Fig. 9]
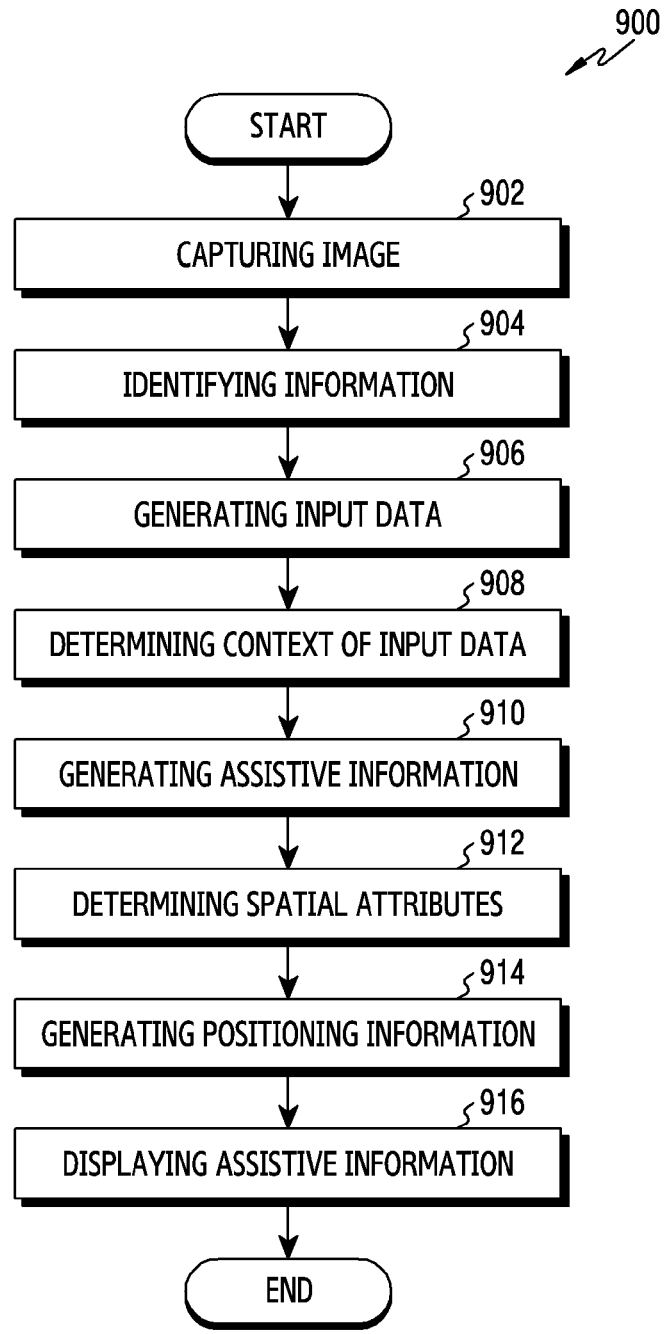

[Fig. 10]
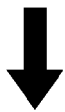
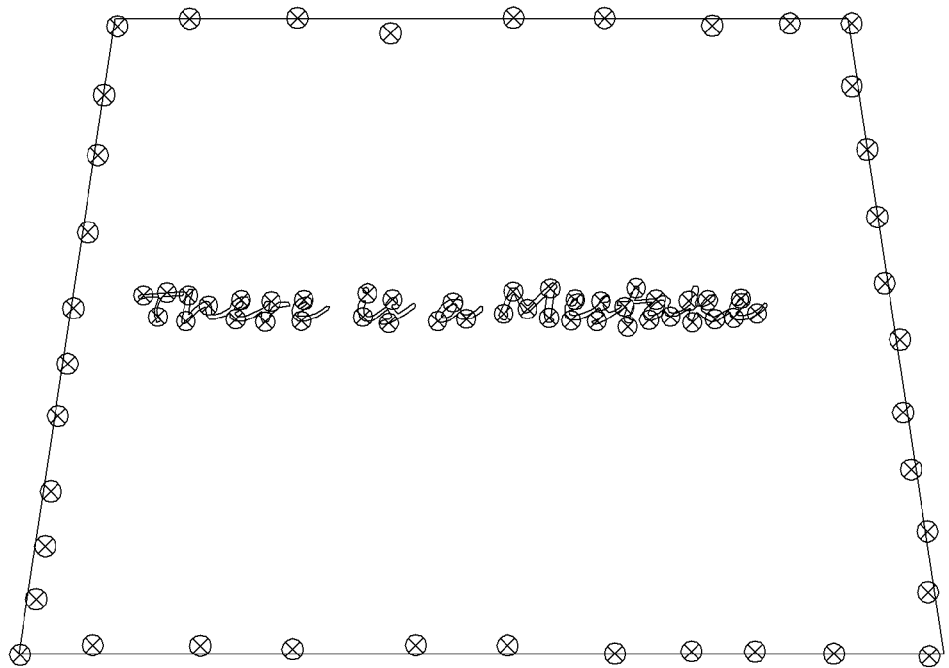

[Fig. 11]
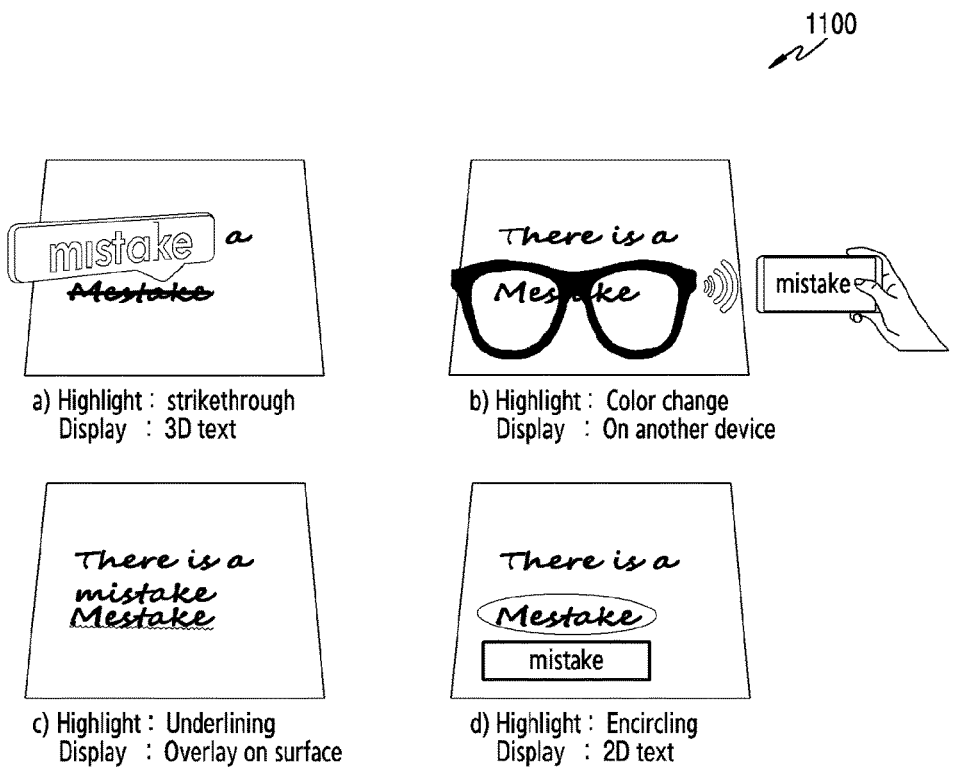
[Fig. 12A]
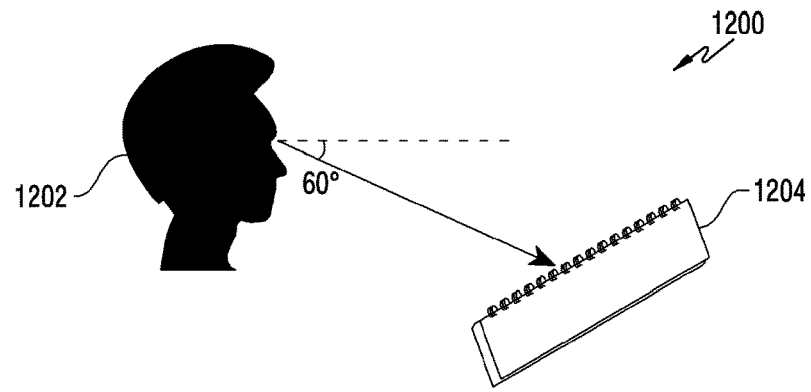
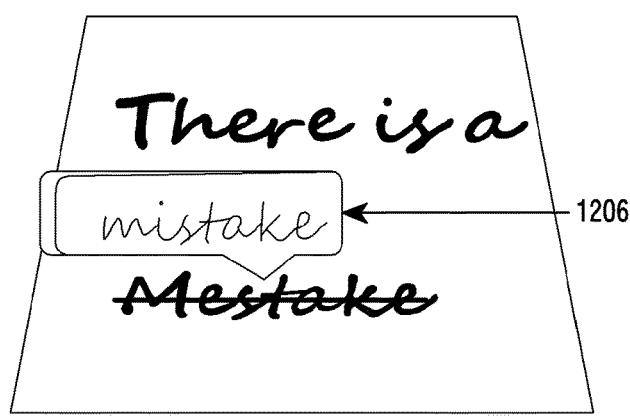

[Fig. 12B]
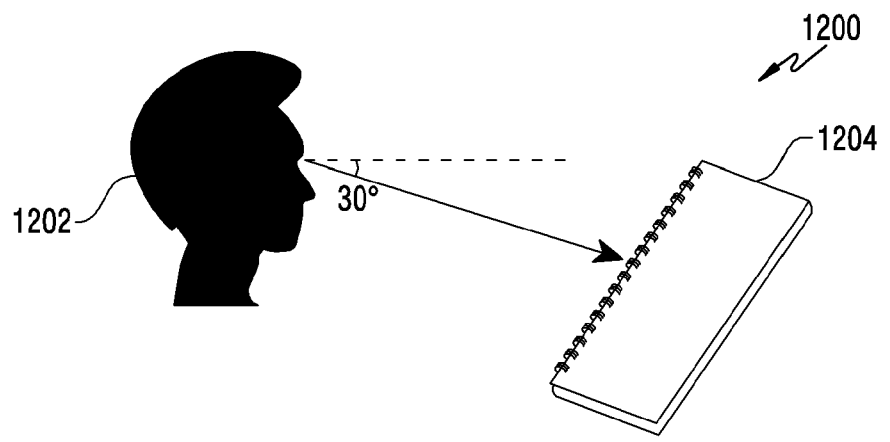
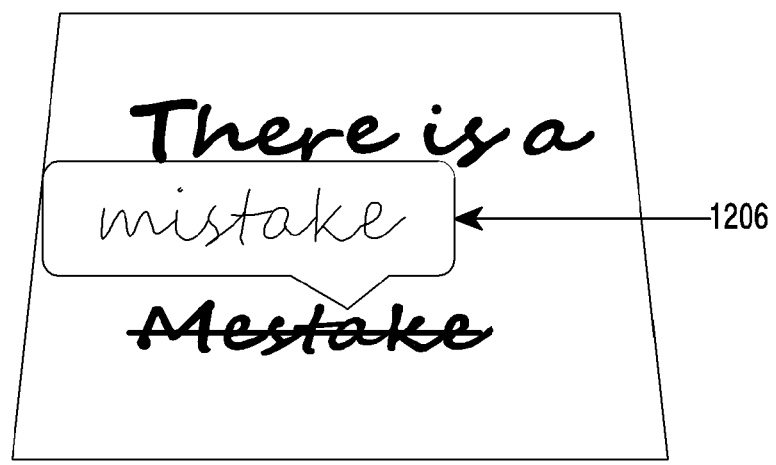

[Fig. 12C]
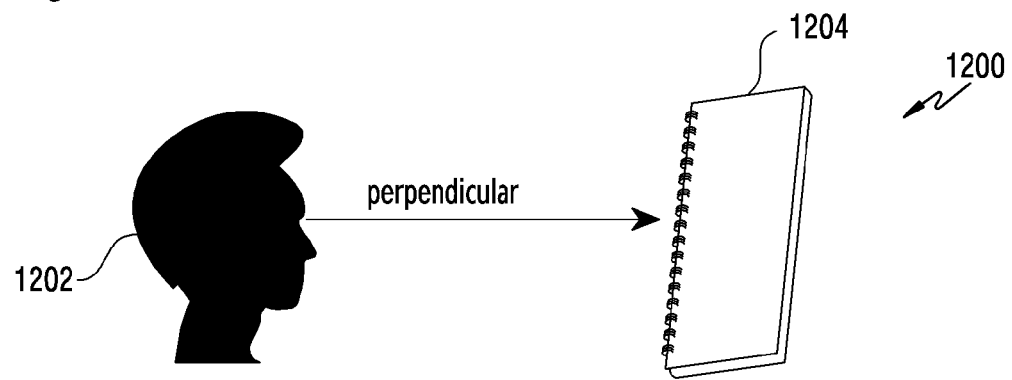

[Fig. 20]
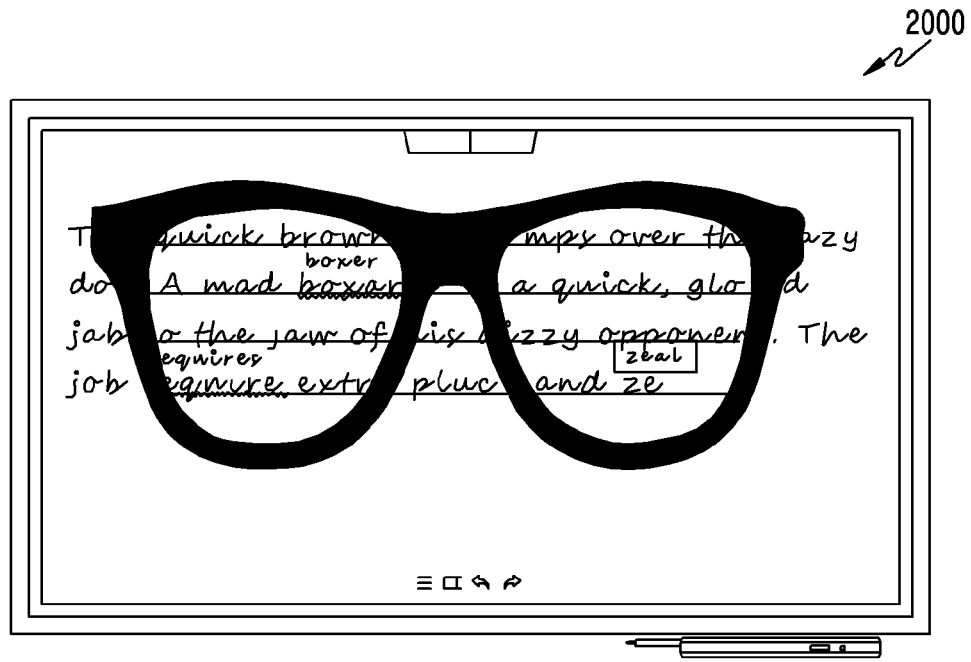
[Fig. 21]
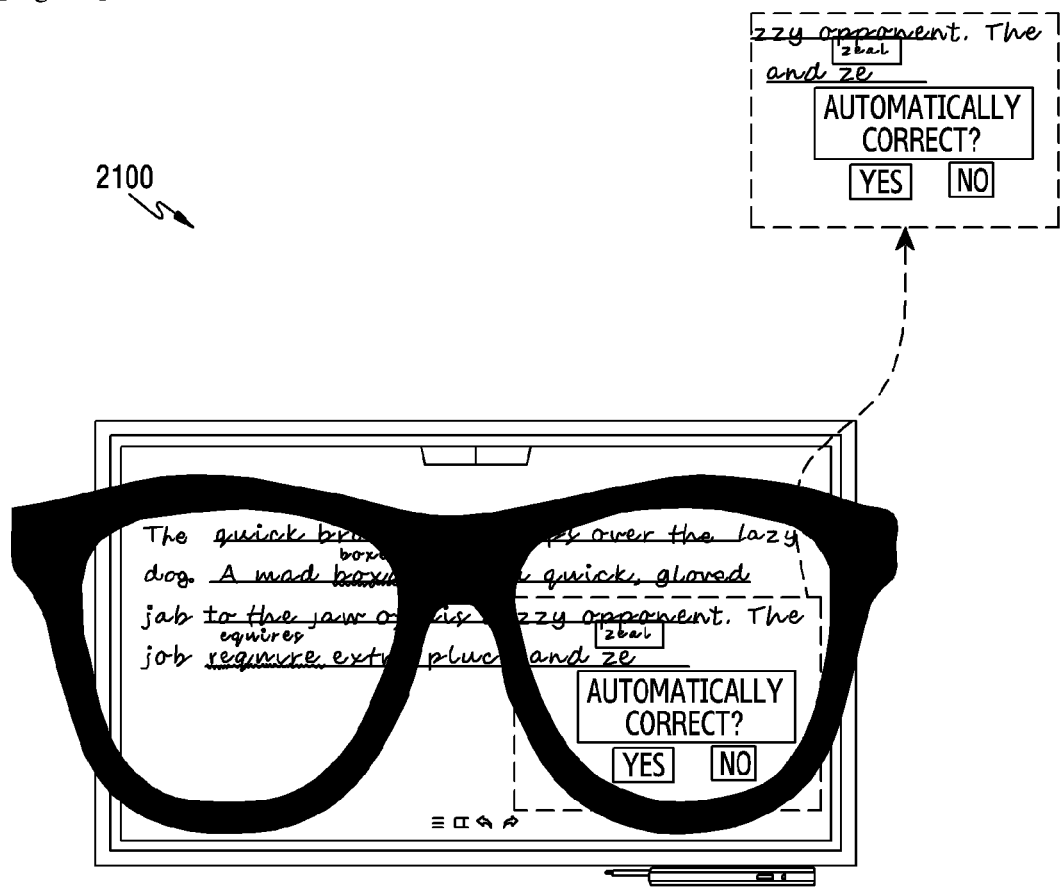

METHOD AND APPARATUS FOR AUGMENTED REALITY

TECHNICAL FIELD

The disclosure relates generally to augmented reality, and, particularly but not exclusively, to apparatus and method for assistance to users while writing in augmented reality system.

BACKGROUND ART

Writing, as an art, has been cherished by humankind since 3200 BC. Tools used for writing have greatly evolved from the prehistoric times. The modern tools of writing, such as, pen, paper, and pencil are widely used by people in present times. The experience of writing, though, has still remained the same. Facilities such as spelling correction and word prediction that are commonplace for typing on a keyboard are not available while writing with a pen and paper. Availability of these features pushed a majority of users to prefer typing over writing.

However, integration of styluses and pens with smartphones and tablets has caused writing to regain popularity. Moreover, writing still remains as a preferred mode of communication for scholastic assignments and examinations in major parts of the world. A few conventional techniques have been attempted to provide aforesaid facilities to the users while writing with pen and paper.

One conventional technique is a smart pen that detects grammatical mistakes and spelling mistakes and provides alerts to the user accordingly. The smart pen uses movement detection to recognize characters and words written by the user. However, the alerts are provided by way of vibration, and hence, are not intuitive for the user. The smart pen uses expensive hardware and hence, is not economically viable for large number of people. The smart pen checks only one error at a time. Hence, there is a possibility that the smart pen misses out on one or more errors when there are a large number of errors in the writing. Moreover, the smart pen does not provide a visual indication of the error, thereby making it extremely difficult for the user to identify the error.

Another smart pen lets the user write words in big handwriting and checks the spelling of the word. The smart pen features a built-in display that is operated by buttons or by voice recognition. When the user speaks a word into the smart pen's microphone, the word is displayed on the smart pen's display. The smart pen also displays meaning and spelling of the handwritten word on the display. However, the smart pen does not recommend or suggest words. The smart pen relies on correct pronunciation by the user. The smart pen does not notify the user in case of a mistake. The smart pen interrupts natural flow of writing.

Yet another smart pen digitizes handwritten content. The smart pen records handwritten content and uploads the recording into a computer or a smartphone. Thereafter, the smart pen synchronizes the same with a recorded audio. This allows the users to replay portions of a recording by tapping on the handwritten text they were writing at the time the recording was made. However, the smart pen is not a feasible solution as it does not work on regular surfaces and requires special paper for writing. The smart pen only digitizes the handwritten content. The smart pen is bulky and weighs five times more than a regular ballpoint pen. The smart pen is expensive as compared to regular ballpoint pens.

There is no conventional technique which provides writing assistance while writing with a regular pen on a regular paper.

Therefore, there is a need for a system that provides assistance to users while writing.

DISCLOSURE OF INVENTION

Technical Problem

An aspect of the present disclosure to provide an apparatus and a method for assistance to users while writing in augmented reality system.

Solution to Problem

The present disclosure provides to introduce concepts related to systems and methods for augmented reality. the present disclosure is neither intended to identify essential features of the present disclosure nor is it intended for use in determining or limiting the scope of the present disclosure.

In an embodiment of the present disclosure, an augmented reality system is provided. The augmented reality system includes an input unit, a text recognition unit, a natural language processing unit, a positioning unit, and an output unit. The input unit is configured to capture an image. The text recognition unit is configured to identify an information on a surface depicted in the image. The text recognition unit generates an input data based on the information. The natural language processing unit is configured to determine a context of the input data. The natural language processing unit generates at least one assistive information based on the context. The positioning unit is configured to determine one or more spatial attributes based on the image. The positioning unit generates a positioning information based on the spatial attributes. The output unit is configured to display the assistive information based on the positioning information.

In another embodiment of the present disclosure, an augmented reality server is provided. The augmented reality server includes an input unit, a text recognition unit, a natural language processing unit, a positioning unit, and an output unit. The input unit is configured to receive an image. The text recognition unit is configured to identify an information on a surface depicted in the image. The text recognition unit generates an input data based on the information. The natural language processing unit is configured to determine a context of the input data. The natural language processing unit generates at least one assistive information based on the context. The positioning unit is configured to determine one or more spatial attributes based on the image. The positioning unit generates a positioning information based on the spatial attributes. The output unit is configured to transmit the assistive information and the positioning information.

In another embodiment of the present disclosure, an augmented reality method is provided. The augmented reality method is implemented in an augmented reality system. The augmented reality method comprises capturing an image and identifying an information on a surface depicted in the image. The method further includes determining a context of the input data and generating at least one assistive information based on the context. Thereafter, one or more spatial attributes are determined based on the image. A positioning information is generated based on the spatial attributes. The assistive information is displayed based on the positioning information.

In an exemplary embodiment, the spatial attributes include at least one of: an angle between the augmented reality system and the surface, a distance between the augmented reality system and the surface, and an obstruction in a field of view between the augmented reality system and the surface.

In another exemplary embodiment, the positioning unit is further configured to determine a position based on the distance, the angle, and a set plane. The positioning unit determines a style based on at least one of: the assistive information, the distance, the angle, a background of the information, and a predefined style preference. The positioning unit further generates the positioning information indicative of at least one of: the plane, the position and the style.

In yet another exemplary embodiment, the positioning unit is further configured to compare the angle with a predetermined threshold angle. The positioning unit sets a two-dimensional plane if the angle is less than the threshold angle and sets a three-dimensional plane if the angle is not less than the threshold angle.

In another exemplary embodiment, the natural language processing unit is further configured to determine a type of the assistive information based on the context of the input data. The natural language processing unit determines a content of the assistive information based on the context of the input data. Further, the natural language processing unit generates the assistive information. The assistive information includes said type and said content.

In another exemplary embodiment, the type of the assistive information includes one or more of: text, audio, video, image, and animation.

In another exemplary embodiment, the content of the assistive information includes one or more of: contextually relevant information, explanation of the information, text correction, text prediction, grammatical error, syntactical error, and indication of plagiarism.

In an exemplary embodiment, the augmented reality system is at least one of: a head-mounted device and a hand-held device.

In an exemplary embodiment, the surface includes a non-digital writing surface.

In another exemplary embodiment, the surface includes a digital display of a user equipment.

In yet another exemplary embodiment, the augmented reality system further comprises a communication unit in communication with the user equipment. The communication unit is configured to: receive a user input from the user equipment. The communication unit transmits the assistive information to the user equipment based on the user input.

In another exemplary embodiment, a handwriting reconstruction unit is configured to detect a style of handwriting of the information and to reconstruct the style of handwriting.

In another exemplary embodiment, the style includes one or more of: size, font, and visual effects.

In another exemplary embodiment, the assistive information is displayed in form of the style of handwriting.

In another exemplary embodiment, the augmented reality system further includes a user interaction unit. The user interaction unit is configured to detect one or more user gestures indicative of an interaction with the assistive information or with the information on the surface depicted in the image. Further, the user interaction unit causes to display an updated assistive information based on the user gestures.

In another exemplary embodiment, the information is at least one of: handwritten information, printed information, electronically displayed information, and virtually projected information.

In another exemplary embodiment, the input unit captures multiple images in real-time.

In another exemplary embodiment, the positioning unit dynamically updates the positioning information based on the real-time images.

Advantageous Effects of Invention

Various embodiments of the present disclosure provide an effect of improving convenience for users who take notes through electronic devices.

BRIEF DESCRIPTION OF DRAWINGS

The detailed description is described with reference to the accompanying figures. The same numbers are used throughout the drawings to reference like features and modules.

FIG. 6 is a flowchart illustrating a method of error correction in accordance with an embodiment of the present disclosure.

FIG. 7 is a flowchart illustrating a method of word prediction in accordance with an embodiment of the present disclosure.

FIG. 8 is a flowchart illustrating a method of word recommendation in accordance with an embodiment of the present disclosure.

FIG. 9 is a flowchart illustrating an AR method in accordance with an embodiment of the present disclosure.

FIG. 10 is a pictorial representation illustrating extraction of map points in accordance with an embodiment of the present disclosure.

FIG. 11 is a pictorial representation illustrating a technique of error highlighting and correction display in accordance with an embodiment of the present disclosure.

FIGS. 12A-12C are pictorial representations illustrating changing styles of assistive information in accordance with an embodiment of the present disclosure.

FIG. 20 is a pictorial representation illustrating a technique of displaying word recommendation and error correction simultaneously to a user on a digital surface in accordance with an embodiment of the present disclosure.

FIG. 21 is a pictorial representation illustrating an interactive assistive information in accordance with an embodiment of the present disclosure.

Figure 1:
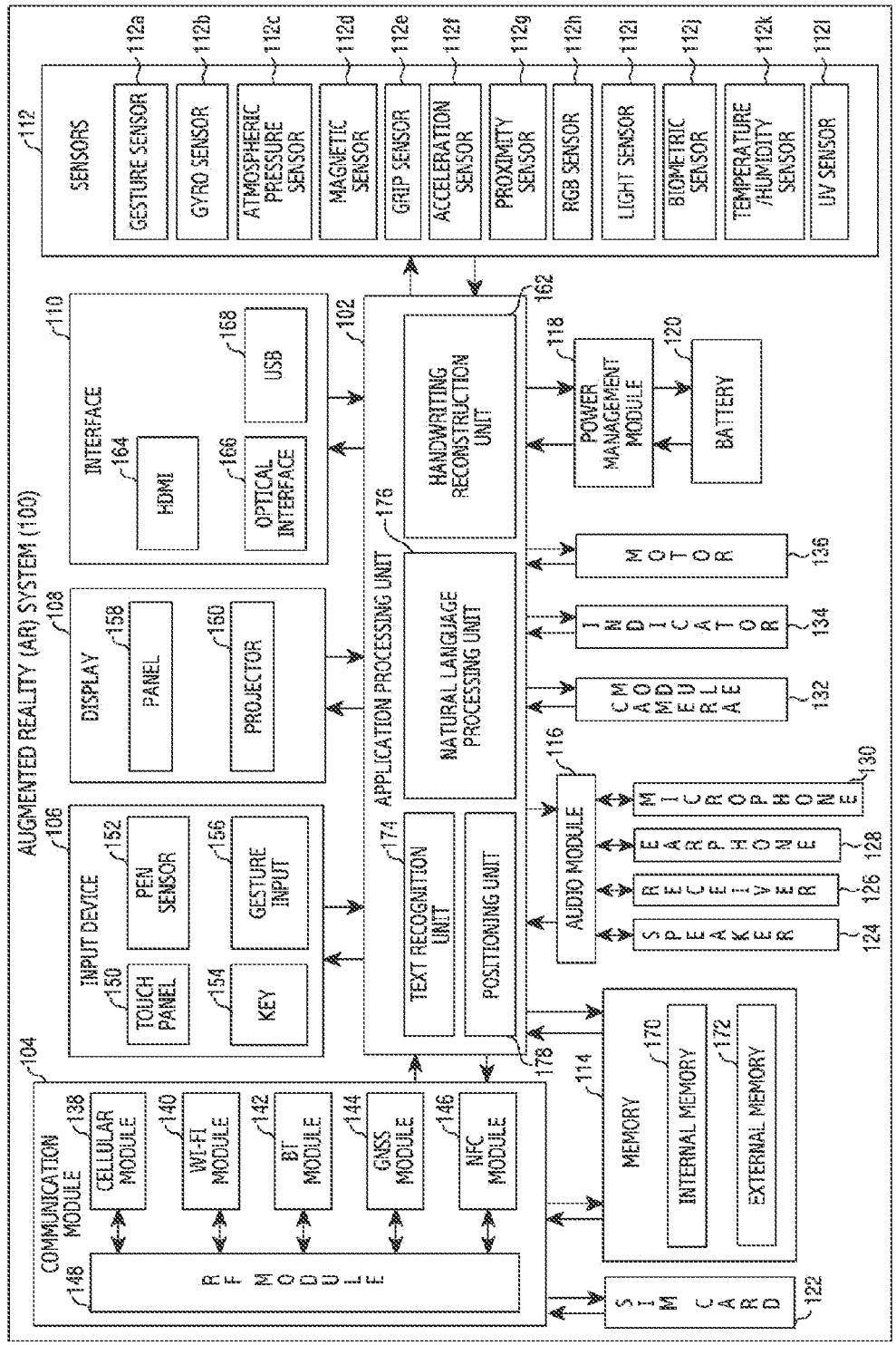
FIG. 1 is a schematic block diagram of an Augmented Reality (AR) system in accordance with an embodiment of the present disclosure.

It should be appreciated by those skilled in the art that any block diagrams herein represent conceptual views of illustrative systems embodying the principles of the present disclosure.

Similarly, it will be appreciated that any flowcharts, flow diagrams, and the like represent various processes which may be substantially represented in computer readable medium and so executed by a computer or processor, whether or not such computer or processor is explicitly shown.

MODE FOR THE INVENTION

In the following description, for the purpose of explanation, specific details are set forth in order to provide an understanding of the present disclosure. It will be apparent, however, to one skilled in the art that the present disclosure may be practiced without these details. One skilled in the art will recognize that embodiments of the present disclosure, some of which are described below, may be incorporated into a number of systems.

Furthermore, connections between components and/or modules within the figures are not intended to be limited to direct connections. Rather, these components and modules may be modified, re-formatted or otherwise changed by intermediary components and modules.

References in the present disclosure to "one embodiment" or "an embodiment" mean that a particular feature, structure, characteristic, or function described in connection with the embodiment is included in at least one embodiment of the invention. The appearances of the phrase "in one embodiment" in various places in the specification are not necessarily all referring to the same embodiment.

The various embodiments of the present disclosure provide a system and a method for augmented reality.

An augmented reality system is provided in an embodiment of the present disclosure. The augmented reality system includes an input unit, a text recognition unit, a natural language processing unit, a positioning unit, and an output unit. The input unit is configured to capture an image. The text recognition unit is configured to identify an information on a surface depicted in the image. The text recognition unit generates an input data based on the information. The natural language processing unit is configured to determine a context of the input data. The natural language processing unit generates at least one assistive information based on the context. The positioning unit is configured to determine one or more spatial attributes based on the image. The positioning unit generates a positioning information based on the spatial attributes. The output unit is configured to display the assistive information based on the positioning information.

An augmented reality server is provided in another embodiment of the present disclosure. The augmented reality server includes an input unit, a text recognition unit, a natural language processing unit, a positioning unit, and an output unit. The input unit is configured to receive an image. The text recognition unit is configured to identify an information on a surface depicted in the image. The text recognition unit generates an input data based on the information. The natural language processing unit is configured to determine a context of the input data. The natural language processing unit generates at least one assistive information based on the context. The positioning unit is configured to determine one or more spatial attributes based on the image. The positioning unit generates a positioning information based on the spatial attributes. The output unit is configured to transmit the assistive information and the positioning information.

An augmented reality method is provided in yet another embodiment of the present disclosure. The augmented reality method is implemented in an augmented reality system. The augmented reality method comprises capturing an image and identifying an information on a surface depicted in the image. The method further includes determining a context of the input data and generating at least one assistive information based on the context. Thereafter, one or more spatial attributes are determined based on the image. A positioning information is generated based on the spatial attributes. The assistive information is displayed based on the positioning information.

The spatial attributes include at least one of: an angle between the augmented reality system and the surface, a distance between the augmented reality system and the surface, and an obstruction in a field of view between the augmented reality system and the surface.

The positioning unit is further configured to determine a position based on the distance, the angle, and a set plane. The positioning unit determines a style based on at least one of: the assistive information, the distance, the angle, a background of the information, and a predefined style preference. The positioning unit further generates the positioning information indicative of at least one of: the plane, the position and the style. The positioning unit is further configured to compare the angle with a predetermined threshold angle. The positioning unit sets a two-dimensional plane if the angle is less than the threshold angle and sets a three-dimensional plane if the angle is not less than the threshold angle.

The natural language processing unit is further configured to determine a type of the assistive information based on the context of the input data. The natural language processing unit determines a content of the assistive information based on the context of the input data. Further, the natural language processing unit generates the assistive information. The assistive information includes said type and said content.

The type of the assistive information includes one or more of: text, audio, video, image, and animation. The content of the assistive information includes one or more of: contextually relevant information, explanation of the information, text correction, text prediction, grammatical error, syntactical error, and indication of plagiarism.

The augmented reality system is at least one of: a head-mounted device and a hand-held device. In an example, the surface includes a non-digital writing surface. In another example, the surface includes a digital display of a user equipment.

The augmented reality system further comprises a communication unit in communication with the user equipment. The communication unit is configured to: receive a user input from the user equipment. The communication unit transmits the assistive information to the user equipment based on the user input.

A handwriting reconstruction unit is configured to detect a style of handwriting of the information and to reconstruct the style of handwriting. The style includes one or more of: size, font, and visual effects. In an example, the assistive information is displayed in form of the style of handwriting.

The augmented reality system further includes a user interaction unit. The user interaction unit is configured to detect one or more user gestures indicative of an interaction with the assistive information or with the information on the surface depicted in the image. Further, the user interaction unit causes to display an updated assistive information based on the user gestures.

In an example, the information is at least one of: handwritten information, printed information, electronically displayed information, and virtually projected information.

The input unit captures multiple images in real-time. The positioning unit dynamically updates the positioning information based on the real-time images.

Referring now to FIG. 1, a schematic block diagram of an Augmented Reality (AR) system (100) is shown in accordance with an embodiment of the present disclosure. The AR system (100) includes an application processing unit (102), a communication module (104), an input device (106), a display (108), an interface (110), a plurality of sensors (112), a memory (114), an audio module (116), a power management module (118), a battery (120), a Subscriber Identification Module (SIM) card (122), a speaker (124), a receiver (126), an earphone (128), a microphone (130), a camera module (132), an indicator (134), and a motor (136).

The communication module (104) includes a cellular module (138), a Wi-Fi module (140), a Bluetooth (BT) module (142), a Global Navigation Satellite System (GNSS) module (144), a Near Field Communication (NFC) module (146), and a Radio Frequency (RF) module (148).

The input device (106) includes a touch panel (150), a pen sensor (152), a key (154), and a gesture input (156).

The display (108) includes a panel (158) and a projector (160).

The interface (110) includes High-Definition Multimedia Interface (HDMI) (164), an optical interface (166), and a Universal Serial Bus (USB) (168).

The sensors (112) include a gesture sensor (112a), a gyro sensor (112b), an atmospheric pressure sensor (112c), a magnetic sensor (112d), a grip sensor (112e), an acceleration sensor (112f), a proximity sensor (112g), an RGB sensor (112h), a light sensor (112i), a biometric sensor (112j), a temperature/humidity sensor (112k), a UV sensor (112l).

The memory (114) includes an internal memory (170) and an external memory (172).

The application processing unit (102) includes a text recognition unit (174), a natural language processing unit (176), a positioning unit (178), and a handwriting reconstruction unit (162). In an example, the positioning unit (178) is implemented as a Simultaneous Localization and Mapping (SLAM) module.

Figure 2:
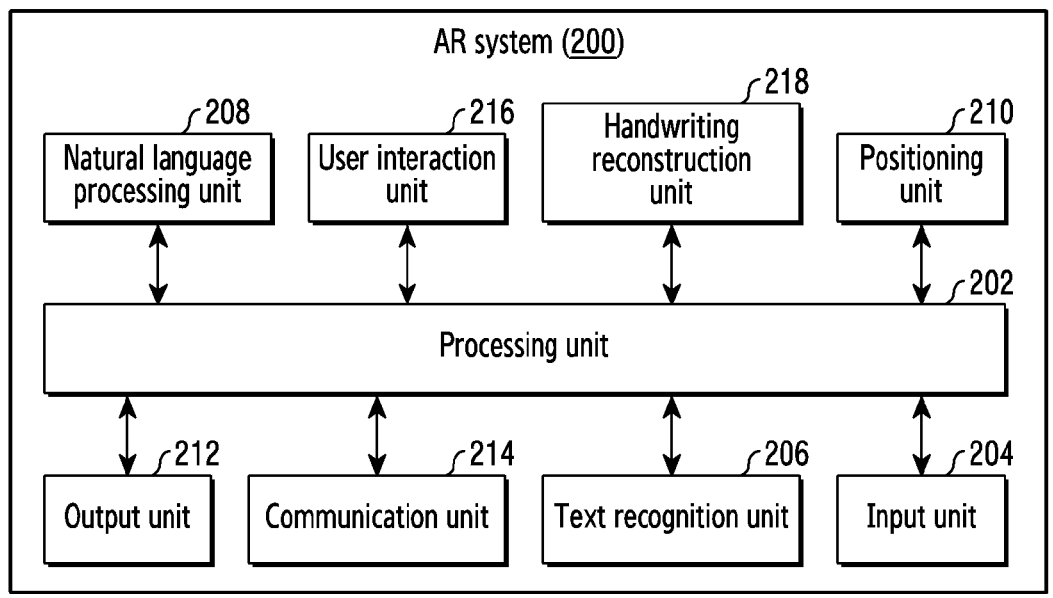
FIG. 2 is a schematic block diagram of an AR system in accordance with an embodiment of the present disclosure.

Referring now to FIG. 2, a schematic block diagram of an Augmented Reality (AR) system (200) is shown in accordance with an embodiment of the present disclosure. The AR system (200) includes a processing unit (202), an input unit (204), a text recognition unit (206), a natural language processing unit (208), a positioning unit (210), an output unit (212), a communication unit (214), a user interaction unit (216), and a handwriting reconstruction unit (218).

The AR system (200) may be in form of a head-mounted device, such as glasses, or a hand-held device, such as a smartphone. In an example, the AR system (200) in form of smart glasses is worn by a user while reading textual information written or printed on any digital or non-digital surface, or while writing textual information on the surface. In another example, the AR system (200) in form of a smartphone is used by the user to view information present on the surface.

Examples of the AR system (200) include devices for receiving live video of real-world or of physical environment. The AR system (200) includes electronic devices capable of supporting AR displays, including but not limited to personal computers, mobile phones, electronic tablets, game consoles, media players, etc. In some implementations, the AR system (200) can be an electronic tablet or an electronic smartphone having a touch sensitive surface.

The input unit (204) includes sensors for dynamically capturing an image of the surface in real-time. In an example, the input unit (204) is a camera coupled with the AR system (200). Alternatively, the input unit (204) may capture a series of images or a real-time video. The input unit (204) transmits the image to the text recognition unit (206).

The text recognition unit (206) receives the image from the input unit (204). The text recognition unit (206) processes the image to identify the surface and the information present on the surface. The information may be printed, written, projected, embossed, or painted on the surface. The information may be handwritten or hand-drawn. The information may be present on a passive surface, such as, a paper, or an active surface, such as, a digital display. The text recognition unit (206) generates input data based on the information. For instance, the text recognition unit (206) identifies presence of words on the surface and uses character recognition methods to generate a text string, as the input data, indicative of the words present on the surface. In an example, the input data is in text or string format. The text recognition unit (206) transmits the input data to the natural language processing unit (208).

The natural language processing unit (208) receives the input data and determines a context of the input data. In an example, when the input information contains words related to a single topic, such as, "pollution", the natural language processing unit (208) determines that the context of the input information might, possible, be an essay or an article on the topic of "pollution". The natural language processing unit (208) generates one or more assistive information based on the context. The assistive information includes a type of the assistive information and a content of the assistive information. The natural language processing unit (208) determines the type and the content of the assistive information based on the context of the input data. The type of the assistive information includes text, audio, video, image, and animation. It will be appreciated by a person of ordinary skill in the art that the assistive information is not limited to the aforementioned types and may include other data formats as well. The content of the assistive information includes, but is not limited to, contextually relevant information, explanation of the information, text correction, text prediction, grammatical error, syntactical error, indication of similarity, text projection, and additional information related to the context. For instance, in the above example, the natural language processing unit (208) determines the type of assistive information to be text and the content of the assistive information to be the dictionary meaning of the word "pollution". The natural language processing unit (208) transmits the assistive information to the output unit (212).

The positioning unit (210) receives the image from the input unit (204) and determines one or more spatial attributes based on the image. Examples of the spatial attributes include an angle between the augmented reality system and the surface, a distance between the augmented reality system and the surface, and an obstruction in a field of view between the augmented reality system and the surface. The positioning unit (210) generates the positioning information based on the spatial attributes. The positioning information is indicative of a position, a plane, and a style for displaying the assistive information.

In an exemplary embodiment, the positioning unit (210) compares the angle with a predetermined threshold angle. The positioning unit (210) sets a two-dimensional plane if the angle is less than the threshold angle. The positioning unit (210) sets a three-dimensional plane if the angle is not less than the threshold angle. For instance, the assistive information is displayed in a three-dimensional (3D) manner when the positioning unit (210) sets a three-dimensional plane and the assistive information is displayed in two-dimensional (2D) manner when the positioning unit (210) sets a two-dimensional plane.

The positioning unit (210) determines the position based on the distance, the angle, and the plane. The positioning unit (210) determines a style based on at least one of: the assistive information, the distance, the angle, a background of the information, and a predefined style preference. The style includes size, font, and visual effects of assistive information. Thereafter, the positioning unit (210) generates the positioning information indicative of the plane, the position, and the style. The positioning unit (210) transmits the positioning information to the output unit (212).

The output unit (212) receives the positioning information from the positioning unit (210) and the assistive information from the natural language processing unit (208). Based on the positioning information, the output unit (212) displays the assistive information to the user. In an exemplary embodiment, the output unit (212) display the assistive information virtually by projecting the information to the user by way of the smart glasses.

In an embodiment, the surface is a digital display, such as, touchscreen display of a user equipment. The communication unit (214) is configured to communicate with the user equipment wirelessly. The communication unit (214) receives a user input from the user equipment and transmits the assistive information to the user based on the user input. In an example, the user equipment may communicate to the AR system (200) a user input indicating to provide further information relating to the displayed assistive information. In another example, the user equipment may communicate to the AR system (200) a user input indicating to turn on or turn off the display of assistive information.

The user interaction unit (216) detects one or more gestures made by the user as an interaction with the assistive information or with the information present on the surface. The user interaction unit (216) updates the assistive information based on the detected gestures and displays the updated assistive information to the user.

The handwriting reconstruction unit (218) detects a handwriting of the user and reconstructs the handwriting of the user. Thereafter, the AR system (200) displays the assistive information in the handwriting of the user.

The AR system (200) operates in real-time. The input unit (204) captures the images in real-time. The positioning unit (210) dynamically updates the positioning information based on the real-time images. Hence, the assistive information is positioned dynamically. In an example, the position of the assistive information is synchronized with movements or change in location or view of the user.

Figure 3:
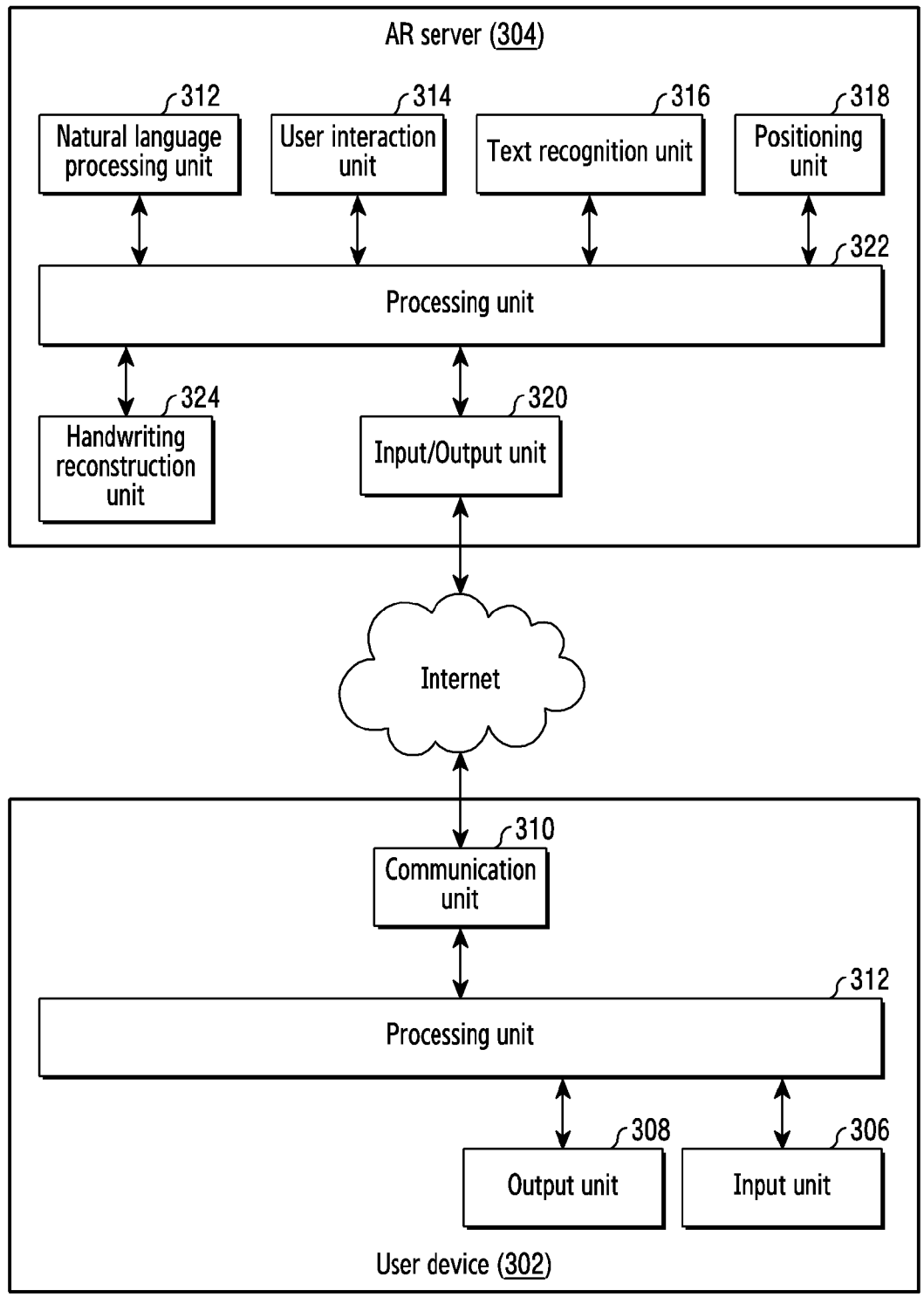
FIG. 3 is a schematic block diagram of an AR server in accordance with an embodiment of the present disclosure.

Referring now to FIG. 3, a schematic block diagram of an AR server (304) is shown in accordance with another embodiment of the present disclosure. The AR server (304) is in communication with the user device (302). The user device (302) includes an input unit (306), an output unit (308), a communication unit (310), and a processing unit (312). The AR server (304) includes a natural language processing unit (312), a user interaction unit (314), a text recognition unit (316), a positioning unit (318), an input/output unit (320), a processing unit (322), and a handwriting reconstruction unit (324).

The AR server (304) is in communication with the user device (302) by way of wired, wireless, or cellular communication networks, such as, but not limited to, Wi-Fi, Bluetooth, and Long Term Evolution (LTE). Examples of the user device (302) include smart glasses. The user device (302) may be used by the user while writing information on a surface.

The input unit (306) of the user device includes sensors for dynamically capturing an image of the surface in real-time. In an example, the input unit (306) is a camera coupled with the user device (302). Alternatively, the input unit (306) may capture a series of images or a real-time video. The user device (302) transmits the image to the AR server (304) by way of the communication unit (310).

The AR server (304) receives the image by way of the input/output unit (320). The text recognition unit (316) processes the image to identify the surface and the information present on the surface. The text recognition unit (316) generates input data based on the information. For instance, the text recognition unit (316) identifies presence of words on the surface and uses character recognition methods to generate a text string, as the input data, indicative of the words present on the surface. In an example, the input data is in text or string format. The text recognition unit (316) transmits the input data to the natural language processing unit (312).

The natural language processing unit (312) receives the input data and determines a context of the input data. The natural language processing unit (312) generates one or more assistive information based on the context. The assistive information includes a type of the assistive information and a content of the assistive information. The natural language processing unit (312) determines the type and the content of the assistive information based on the context of the input data. The natural language processing unit (312) transmits the assistive information to the input/output unit (320).

The positioning unit (318) determines the spatial attributes based on the image. The positioning unit (318) generates the positioning information based on the spatial attributes. The positioning information is indicative of a position, a plane, and a style for displaying the assistive information. In an embodiment, the position unit (318) is structurally and functionally similar to the position unit (210).

The input/output unit (320) receives the positioning information from the positioning unit (318) and the assistive information from the natural language processing unit (312). The input/output unit (320) transmits the positioning information and the assistive information to the user device (302).

The user device (302) receives the positioning information and the assistive information. The user device (302) displays the assistive information to the use based on the received positioning information by way of the output unit (308).

Figure 4:
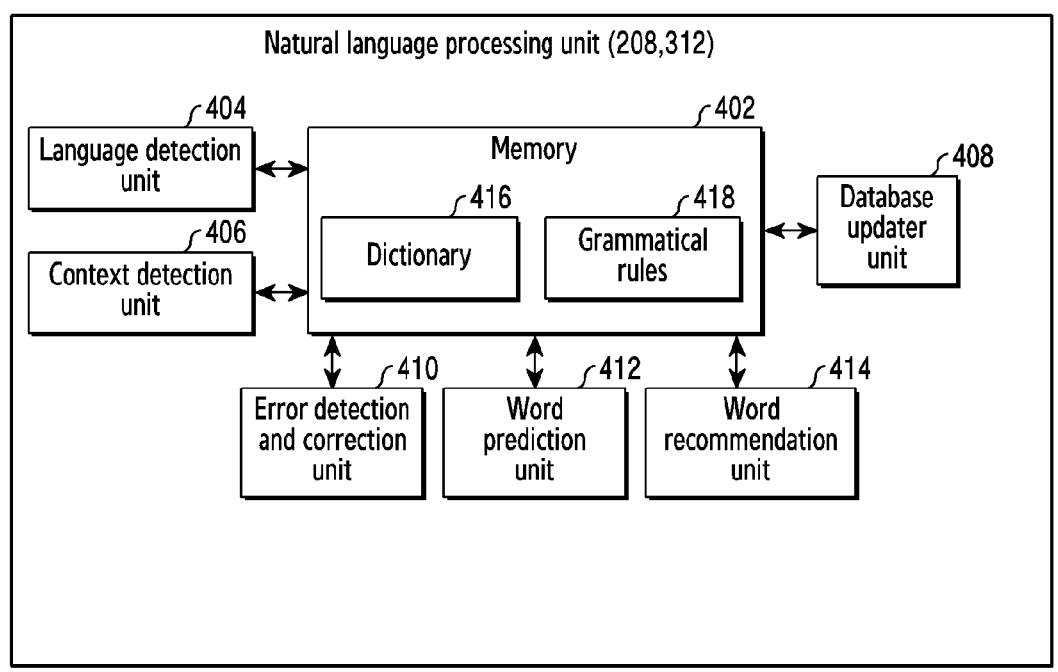
FIG. 4 is a schematic block diagram of a natural language processing unit in accordance with an embodiment of the present disclosure.

Referring now to FIG. 4, a schematic block diagram of the natural language processing unit (208,312) is shown in accordance with an embodiment of the present disclosure. The natural language processing unit (208,312) includes a memory (402), a language detection unit (404), a context detection unit (406), a database updater unit (408), an error detection and correction unit (410), a word prediction unit (412), and a word recommendation unit (414). The memory (402) stores a dictionary (416) and grammatical rules (418).

The language detection unit (404) receives the input data and detects language of the input data. In an example, the language detection unit (404) determines vocabulary of the input data and linguistic characteristics of the input data and compares with the dictionary (416) and the grammatical rules (418) stored in the memory (402) and determines the language based on the comparison.

The context detection unit (406) determines the context of the input data. Examples of the context of the input data include, but are not limited to, idea, event or statement relating to the input data. In an example, the context detection unit (406) determines similarity metrics and PoS (Part-of-Speech) tagging to determine the context of the input data. The context detection unit (406) may be used to provide personalized recommendations to the user.

The error detection and correction unit (410) processes the input data to determine errors or mistakes, such as, grammatical errors, punctuation errors, style errors, and spelling mistakes in the input data. Thereafter, the error detection and correction unit (410) determines one or more corrections for the identified errors or mistakes. In an example, the error detection and correction unit (410) also provides virtual margin or virtual grid lines to the user for providing assistance in writing. In an example, the assistive information is in form of virtual margins or virtual grid lines.

The word prediction unit (412) predicts a word being written by the user on the surface. In an example, the word prediction unit (412) predicts the word based on writing history of the user and/or the context of the input data.

The word recommendation unit (414) recommends a word based on the input data. The recommended word may be a word that follows next in a sentence being written by the user. The word recommendation unit (414) may recommend the word based on the writing history of the user and/or the context of the input data.

The database updater unit (408) updates the dictionary (416) stored in the memory (402). In an example, the database updater unit (408) updates the dictionary (416) by querying a remote server for vocabulary updates. In an alternative example, the remote server pushes the vocabulary updates to the database updater unit (408). The database updater unit (416) may also update the dictionary (416) with user-defined words.

In an embodiment of the present disclosure, the natural language processing unit (208) provides following corrections: spelling correction, grammar correction, and style correction. For spelling correction, the natural language processing unit (208) searches the extracted words in the dictionary (416) and accordingly highlights the spelling errors along with the correct spellings by way of the output unit (212). For grammar correction, the natural language processing unit (208) checks whether the extracted completed sentences follow grammatical rules (418). If the natural language processing unit (208) determines presence of any grammatical errors in the input data, the error and the correction are highlighted by way of the output unit (212). For style correction, the natural language processing unit (208) checks for styling errors present in the input data. Examples of styling errors include switching between tenses in sentences, equal length of sentences (monotony) etc. The natural language processing unit (208) also detects whether the user needs assistance in determining outer margin or gridline to make words more aligned with each other.

In another embodiment of the present disclosure, the natural language processing unit (208) performs word prediction. In word prediction, the natural language processing unit (208) detects incomplete words and predicts the completed word that is being written by the user. Here, known words are stored in a database within the memory (402) in form of a tree data structure, for instance, a search tree, an ordered tree data structure used for storing a dynamic set or an associative array where keys are usually strings. A position of a node in the tree defines the corresponding key. As the characters are written by the user, a word corresponding to the letters is searched in the database. Since there can be multiple words that correspond to the written letters, context of the input data that is already written is used to reduce search space and filter out the words which are irrelevant to the user. Sometimes, the user may spell the word incorrectly which may result in incorrect word prediction or even no prediction at all. In such scenarios, fuzzy matching/searching is used. Fuzzy matching/searching works with matches that may be less than 100% perfect when finding correspondences between segments of the input data and entries in the database of previous translations. A threshold percentage value is set, and when an exact match is not found, the natural language processing unit (208) searches for a match which exceeds the threshold percentage value.

In yet another embodiment of the present disclosure, the natural language processing unit (208) provides word recommendations to the user to intelligently recommend words which can be written next in the sentence. Here, the words are recommended as per the context of the input data determined by the context detection unit (406). Based on the context of the input data, the natural language processing unit (208) searches the database to fetch relevant words which follow the grammar of the language. The natural language processing unit (208) may use models such as N-Gram model, Unigram Model/Finite State Automata (FSA), or Neural Language Model to provide word recommendations.

The N-Gram model attempts to guess the next word in the sentence based upon the (n−1) previous words in the sentence. The model guesses a probability of a given word without any context and the probability of the word given the last (n−1) words. Bi-gram model and Tri-gram model denote n-gram model with n=2 and n=3, respectively.

$$P(w_1, \ldots, w_m) = \prod_{i=1}^{m} P(w_i | w_1, \ldots, w_{i-1}) \approx \prod_{i=1}^{m} P(w_i | w_{i-(n-1)}, \ldots, w_{i-1})$$

The Unigram Model/Finite State Automata (FSA), is a special case of N-Gram model where n=1. A unigram model used in information retrieval can be treated as the combination of several FSA. Here, the probability of each word depends on that word's own probability in the document.

$$P_{uni}(t_1 t_2 t_3) = P(t_1) P(t_2) P(t_3)$$

The Neural Language Model is also known as continuous space language model. The neural language model uses continuous representations or embedding of words to make predictions using neural networks. A neural network represents words in a distributed way, as non-linear combinations of weight in a neural net, and is trained to predict a probability distribution over vocabulary, given some linguistic context. The neural net architecture might be feed-forward or recurrent.

$$P(w_t | context) \forall t \in V$$

Figure 5:
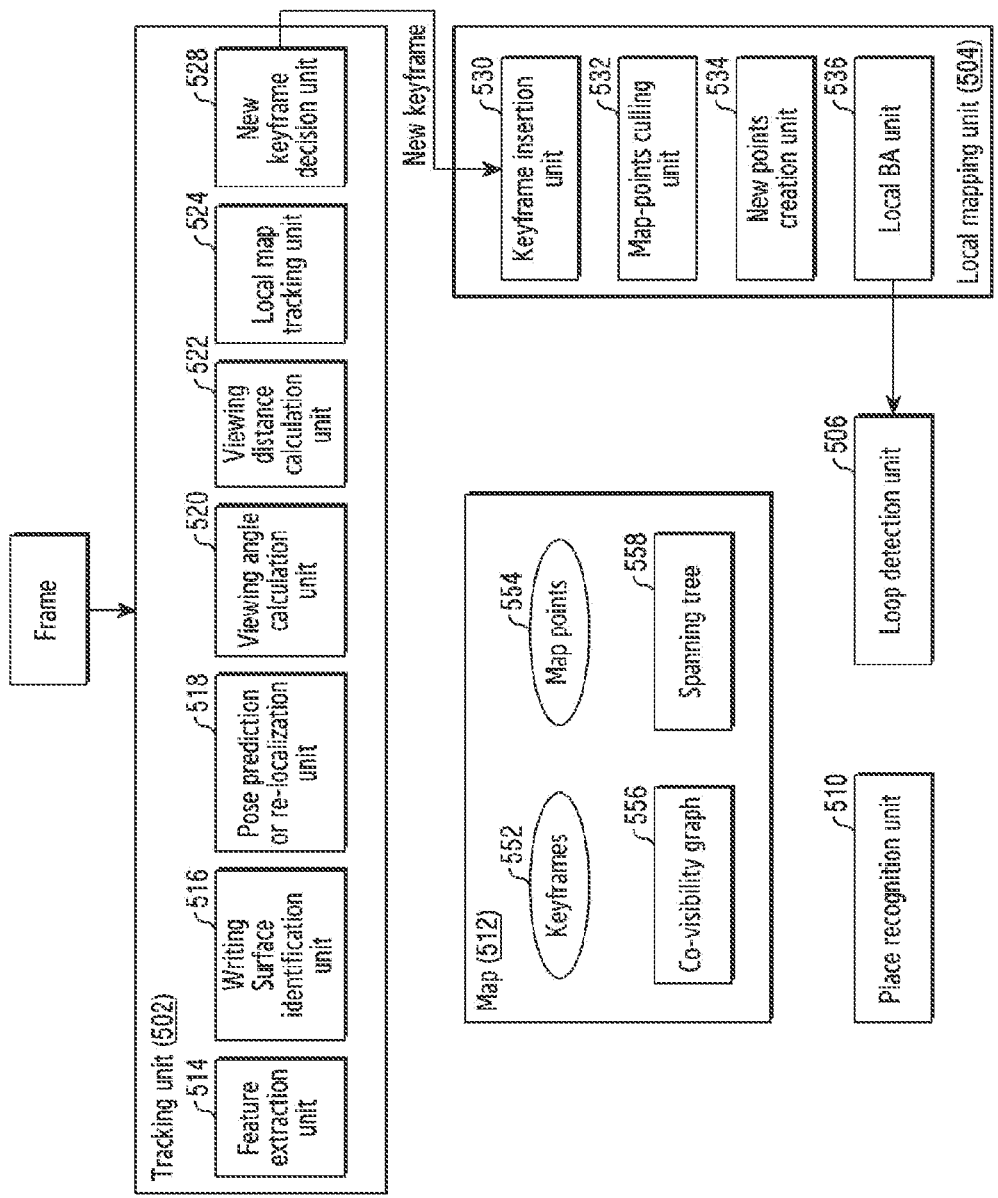
FIG. 5 is a schematic block diagram of a positioning unit in accordance with an embodiment of the present disclosure.

Referring now to FIG. 5, a schematic block diagram of the positioning unit (210, 318) is shown in accordance with an embodiment of the present disclosure. The positioning unit (210, 318) includes a tracking unit (502), a local mapping unit (504), a loop detection unit (506), a place recognition unit (510), and a map (512). The map (512) is stored in a memory (not shown). In an exemplary embodiment, the positioning unit (210, 318) is a Simultaneous Localization and Mapping (SLAM) module. The tracking unit (502) includes a feature extraction unit (514), a writing surface identification unit (516), a pose prediction or re-localization unit (518), a viewing angle calculation unit (520), a viewing distance calculation unit (522), a local map tracking unit (524), and a new keyframe decision unit (528). The local mapping unit (504) includes a keyframe insertion unit (530), a map-points culling unit (532), a new points creation unit (534), and a local Bundle Adjustment (BA) unit (536). The map (512) includes one or more keyframes (552), one or more map points (554), a co-visibility graph (556), and a spanning tree (558).

In an embodiment, the positioning unit (210, 318) has three main parallel threads: a tracking thread, a local mapping thread, and a loop closing thread.

The tracking thread is executed in the tracking unit (502). The tracking unit (502) localizes the camera of the input unit (204) with every frame. It detects writing surface, continuously tracks distance and angle between device and writing surface and decides insertion of a new keyframe. The place recognition unit (510) is used to perform a global re-localization of camera and writing surface in case tracking is lost due to some abrupt movements. After an initial estimation of the camera pose and feature matchings, a local visible map is retrieved using co-visibility graph (556) of keyframes (552). Then, matches with the local map points (554) are searched by re-projection for optimizing the camera pose.

The feature extraction unit (514) extracts FAST corners (1000~2000) from every captured frame depending upon its resolution. With the increase of resolution, more corners are needed. In an example, for an image with resolution 640× 480, 1000 corners are suitable to extract.

The local map tracking unit (524) tracks the local map after estimating the camera pose and initial set of feature matches. The local map contains the set of keyframes that share map points (554) with the current frame, and a set of their neighbours in the co-visibility graph (556). The local map also has a reference keyframe which shares most map points (554) with current frame.

The new keyframe decision unit (528) decides if the current frame is spawned as a new keyframe. The current frame is computed as new keyframe if it has more than 50 map points and tracks less than 90% of map points of reference frame.

The local mapping thread is executed in the local mapping unit (504). The local mapping unit (504) processes new keyframes (552) and optimizes the map points to achieve an optimal reconstruction in the surroundings of the camera pose. It tries to triangulate new points by matching features in the new keyframe with the features of keyframes (552) present in the co-visibility graph (556). It then applies a point culling policy on extracted map points to retain only points which are high in quality.

The keyframe insertion unit (530) adds a node in the co-visibility graph (556) for each keyframe and updates its edges with other nodes according to shared map points with other keyframes (552), Thereafter, the spanning tree (558) is updated by linking inserted keyframe with the keyframe with most points in common The map-points culling unit (532) ensures that the frames are trackable and are not wrongly triangulated. For a point to be considered trackable, it must be present in one-fourth of the frames in which it is predicted to be visible. The map-points culling unit also detects and removes redundant keyframes. If 90% of the map points of a keyframe are already present in at least three other keyframes, then it is considered redundant.

The new points creation unit (534) creates new map points (554) from connected keyframes in the co-visibility graph (556). A match is searched for each unmatched feature in the keyframe, and matches that do not comply with epipolar constraints are discarded.

The local BA unit (536) optimizes all the map points seen by currently processed keyframe and the keyframes (552) connected to it.

The loop closing thread is executed in the loop detection unit (506). The loop detection unit searches for a loop in every new keyframe. If a loop is detected, both sides of the loop are aligned, and duplicated points are fused. Similarity transformation from current keyframe and loop keyframe is used to validate a loop.

Referring now to FIG. 6, a flowchart depicting a method of error correction is shown in accordance with an embodiment of the present disclosure. The flowchart of FIG. 6 is explained below with reference to the AR system (200) of FIG. 2.

At step 602, the input unit (204) captures the image dynamically and in real-time.

At step 604, the processing unit (202) processes the image to determine whether the image is clear or not.

If, at step 604, the processing unit (202) determines that the image is clear, step 606 is executed.

At step 606, the text recognition unit (206) extracts handwriting information of the input data from the image.

If at step 604, the processing unit (202) determines that the image is not clear, step 602 is executed.

At step 608, the natural language processing unit (208) determines whether there are any errors in the input data.

If, at step 608, the text natural language processing unit (208) determines that there are errors in the input data, step 610 is executed.

At step 610, the output unit (212) highlights the errors in the image. The highlights are displayed to the user virtually over the image.

At step 612, the output unit (212) displays the error corrections for the input data. The corrections are displayed to the user virtually over the image.

Referring now to FIG. 7, a flowchart depicting a method of word prediction is shown in accordance with an embodiment of the present disclosure. The flowchart of FIG. 7 is explained below with reference to the AR system (200) of FIG. 2.

At step 702, the input unit (204) captures the image dynamically and in real-time.

At step 704, the processing unit (202) processes the image to determine whether the image is clear or not.

If, at step 704, the processing unit (202) determines that the image is clear, step 706 is executed.

At step 706, the text recognition unit (206) extracts handwriting information of the input data from the image.

If at step 704, the processing unit (202) determines that the image is not clear, step 702 is executed.

At step 708, the natural language processing unit (208) determines whether there are any incomplete words in the input data.

If, at step 708, the natural language processing unit (208) determines that there are incomplete words in the input data, step 710 is executed.

At step 710, the natural language processing unit (208) predicts the incomplete word.

At step 712, the output unit (212) displays the word predictions to the user virtually over the image.

Referring now to FIG. 8, a flowchart depicting a method of word recommendation is shown in accordance with an embodiment of the present disclosure. The flowchart of FIG. 8 is explained below with reference to the AR system (200) of FIG. 2.

At step 802, the input unit (204) captures the image dynamically and in real-time.

At step 804, the processing unit (202) processes the image to determine whether the image is clear or not.

If, at step 804, the processing unit (202) determines that the image is clear, step 806 is executed.

At step 806, the text recognition unit (206) extracts handwriting information of the input data from the image.

If at step 804, the processing unit (202) determines that the image is not clear, step 802 is executed.

At step 808, the natural language processing unit (208) determines whether there is any incomplete sentence in the input data.

If, at step 808, the natural language processing unit (208) determines that there is an incomplete sentence in the input data, step 810 is executed.

At step 810, the natural language processing unit (208) determines word recommendations for the incomplete sentence.

At step 812, the output unit (212) displays the word recommendations to the user virtually over the image.

Referring now to FIG. 9, a flowchart depicting an AR method is shown in accordance with an embodiment of the present disclosure. The flowchart of FIG. 9 is explained below with reference to the AR system (200) of FIG. 2.

At step 902, the input unit (204) captures the image.

At step 904, the text recognition unit (206) identifies the information on the surface depicted in the image.

At step 906, the text recognition unit (206) generates an input data based on the information.

At step 908, the natural language processing unit (208) determines the context of the input data.

At step 910, the natural language processing unit (208) generates at least one assistive information based on the context.

At step 912, the positioning unit (210) determines one or more spatial attributes based on the image.

At step 914, the positioning unit (210) generates the positioning information based on the spatial attributes.

At step 916, the output unit (212) displays the assistive information based on the positioning information.

Referring now to FIG. 10, extraction of map points is depicted in accordance with an embodiment of the present disclosure.

The positioning unit (210) extracts features from the image in user's field of view. The features are referred as map points (554) and are used for tracking camera pose. Subsequent to initial pose estimation, constant velocity model is used to predict the camera pose and perform guided search of the map points (554) being observed by the user.

Referring now to FIG. 11, a technique of error highlighting and correction display is depicted in accordance with an embodiment of the present disclosure.

The assistive information, such as, error detection, error correction, word prediction, or word recommendation may be displayed in many ways. Errors can be notified to the user through multiple ways, such as, underlining the error, changing color of the error, striking through the error, encircling the error and notification of the error through voice. The display of error corrections, word predictions and recommendation of words can be through overlay of the assistive information on the writing surface, non-overlaying display of the assistive information, notification to the user through voice and display on other user devices such as smartphones, wearable devices etc.

Referring now to FIGS. 12A-12C, changing styles of assistive information according to a viewing angle are depicted in accordance with an embodiment of the present disclosure.

In an example depicted in FIG. 12, a user (1202) has written information "There is a Mestake" on a surface (1204). The information consists of a spelling mistake, i.e., the user (1202) has erroneously spelt "Mistake" as "Mestake".

The AR system (200) captures an image of the information written by the user (1202) by way of the input unit (204). The text recognition unit (206) processes the image to identify the text written by the user (1202). The natural language processing unit (208) identifies the context of the text written by the user (1202) and generates appropriate assistive information (1206). In this example, the assistive information is in form of error correction, i.e., "Mistake". The positioning unit (210) determines the angle made by the user (1202) with the surface (1204). The positioning unit (210) compares the angle with a threshold angle and determines positioning information for the assistive information (1206). The assistive information (1206) is displayed as per the position and orientation calculated by the positioning unit (210). The positioning unit (210) continuously monitors the user's (1202) field of view and updates the position and orientation of the displayed assistive information (1206) accordingly.

In FIG. 12A, the angle between the user (1202) and the surface (1204) is 60°. The positioning unit (210) determines whether the angle is more or less than the threshold angle and accordingly, sets the plane for displaying the assistive information (1206). Here, the positioning unit (210) sets a 3D plane and accordingly, the assistive information (1206) is displayed to the user (1202) in 3D format and in a tilted manner.

In FIG. 12B, the angle between the user (1202) and the surface (1204) is 30°. Here, the positioning unit (210) sets a 3D plane and accordingly, the assistive information (1206) is displayed to the user (1202) in 3D format and in an upright manner.

In FIG. 12C, the angle between the user (1202) and the surface (1204) is 90°. The positioning unit (210) determines whether the angle is more or less than the threshold angle and accordingly, sets the plane for displaying the assistive information (1206). Here, the positioning unit (210) sets a 2D plane and accordingly, the assistive information (1206) is displayed to the user (1202) in 2D format.

Figure 13:
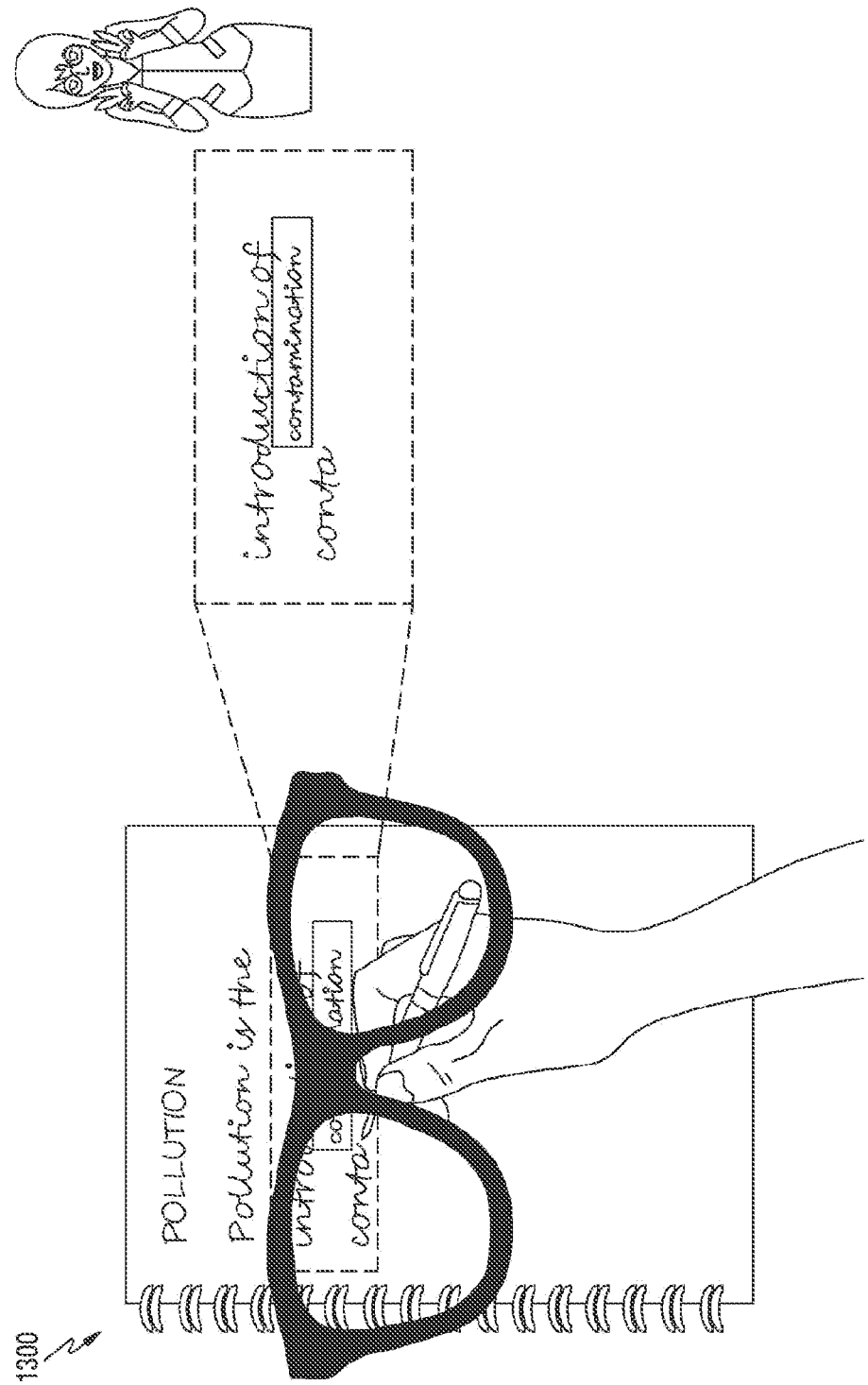
FIG. 13 is a pictorial representation illustrating a technique of contextual word prediction in accordance with an embodiment of the present disclosure.

Referring now to FIG. 13, a technique of contextual word prediction is depicted in accordance with an embodiment of the present disclosure.

Here, the AR system (200) detects the incomplete word starting with 'conta'. The AR system (200) search the database and concludes that the word that the user is trying to write is 'contamination'. The AR system (200) also calculates visual aspects like size and position where the word prediction is be displayed. The predicted word is then displayed on by the output unit (212) such that the user faces no problem in accessing the resultant hint.

Figure 14:
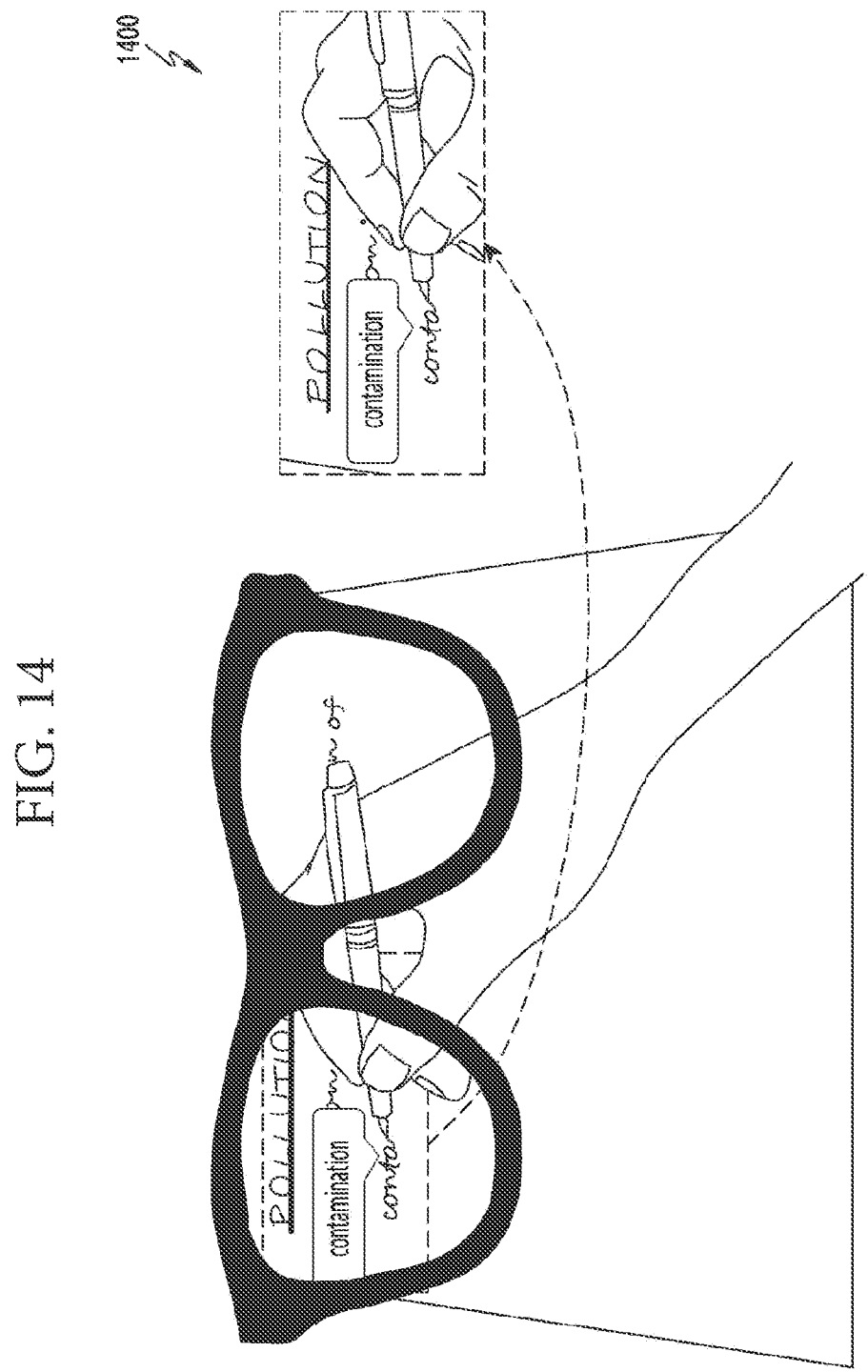
FIG. 14 is a pictorial representation illustrating a technique of displaying a word prediction in 3D format in accordance with an embodiment of the present disclosure.

Referring now to FIG. 14, a technique of displaying a word prediction in 3D format is depicted in accordance with an embodiment of the present disclosure.

The AR system (200) may also utilize z-axis or 3D plane for displaying the word prediction.

Figure 15:
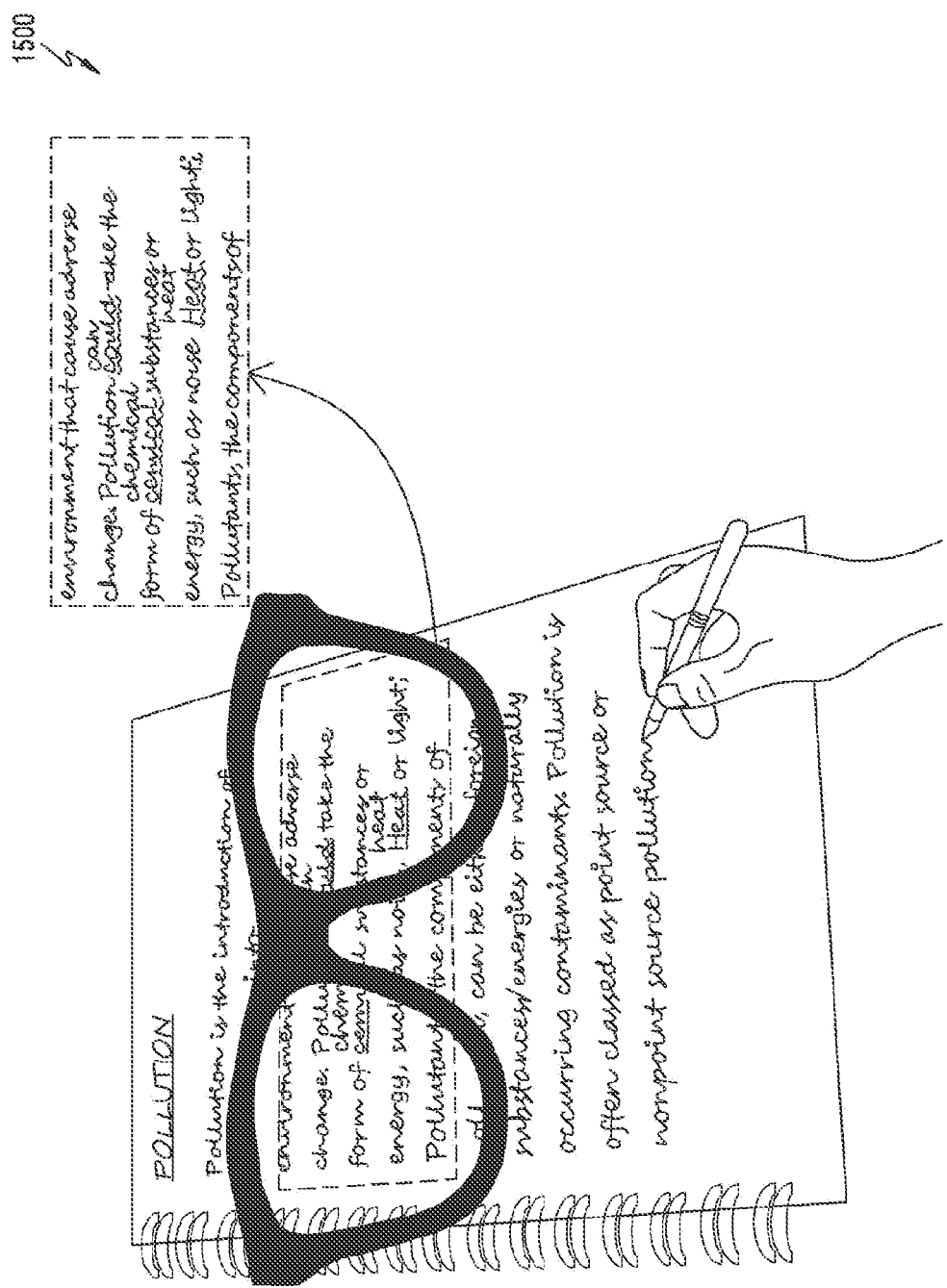
FIG. 15 is a pictorial representation illustrating a technique of highlighting different errors and displaying corresponding corrections in user's style of writing in accordance with an embodiment of the present disclosure.

Referring now to FIG. 15, a technique of highlighting different errors and displaying corresponding corrections in user's style of writing is depicted in accordance with an embodiment of the present disclosure.

Figure 16:
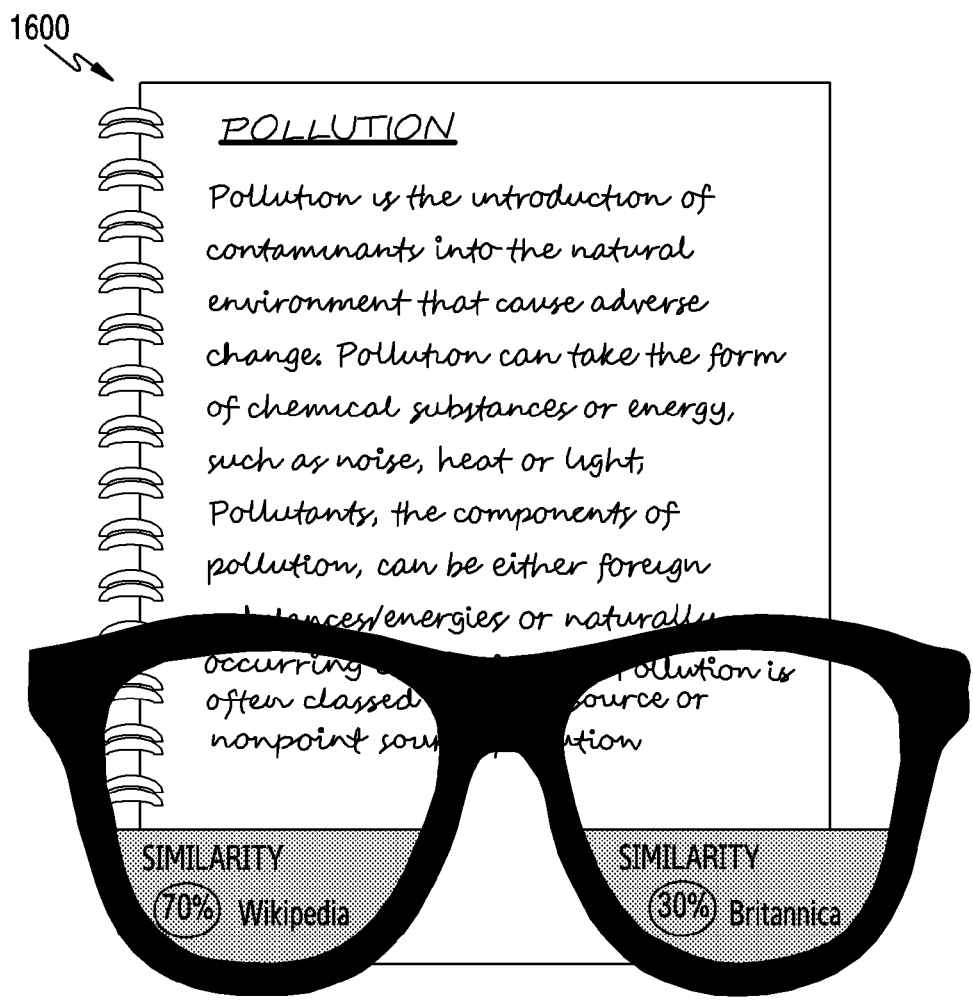
FIG. 16 is a pictorial representation illustrating a technique of similarity check in accordance with an embodiment of the present disclosure.

Referring now to FIG. 16, a technique of similarity check is depicted in accordance with an embodiment of the present disclosure.

The AR system (200) extracts the input data from the image of the user's field of view. The input data is compared against the information available on the internet and other available information sources to obtain similarity. The similarity between the text written by the user and the available information is displayed to the user in the form of percentage of similarity.

Figure 17:
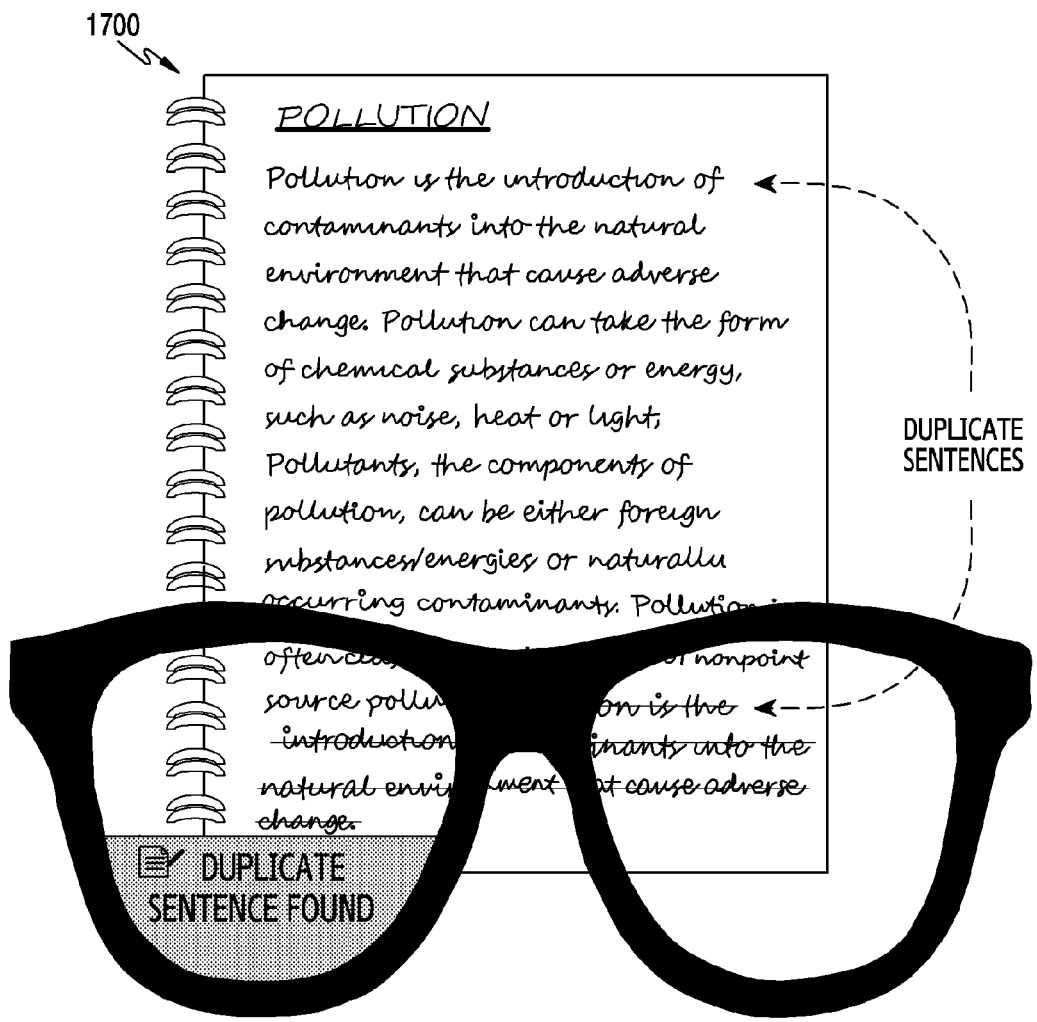
FIG. 17 is a pictorial representation illustrating a technique of checking for repetitive information in accordance with an embodiment of the present disclosure.

Referring now to FIG. 17, a technique of checking for repetitive information is depicted in accordance with an embodiment of the present disclosure.

The AR system (200) detects one or more words/sentences that are repeated in the user's input data and highlights the repeated information to the user.

Figure 18:
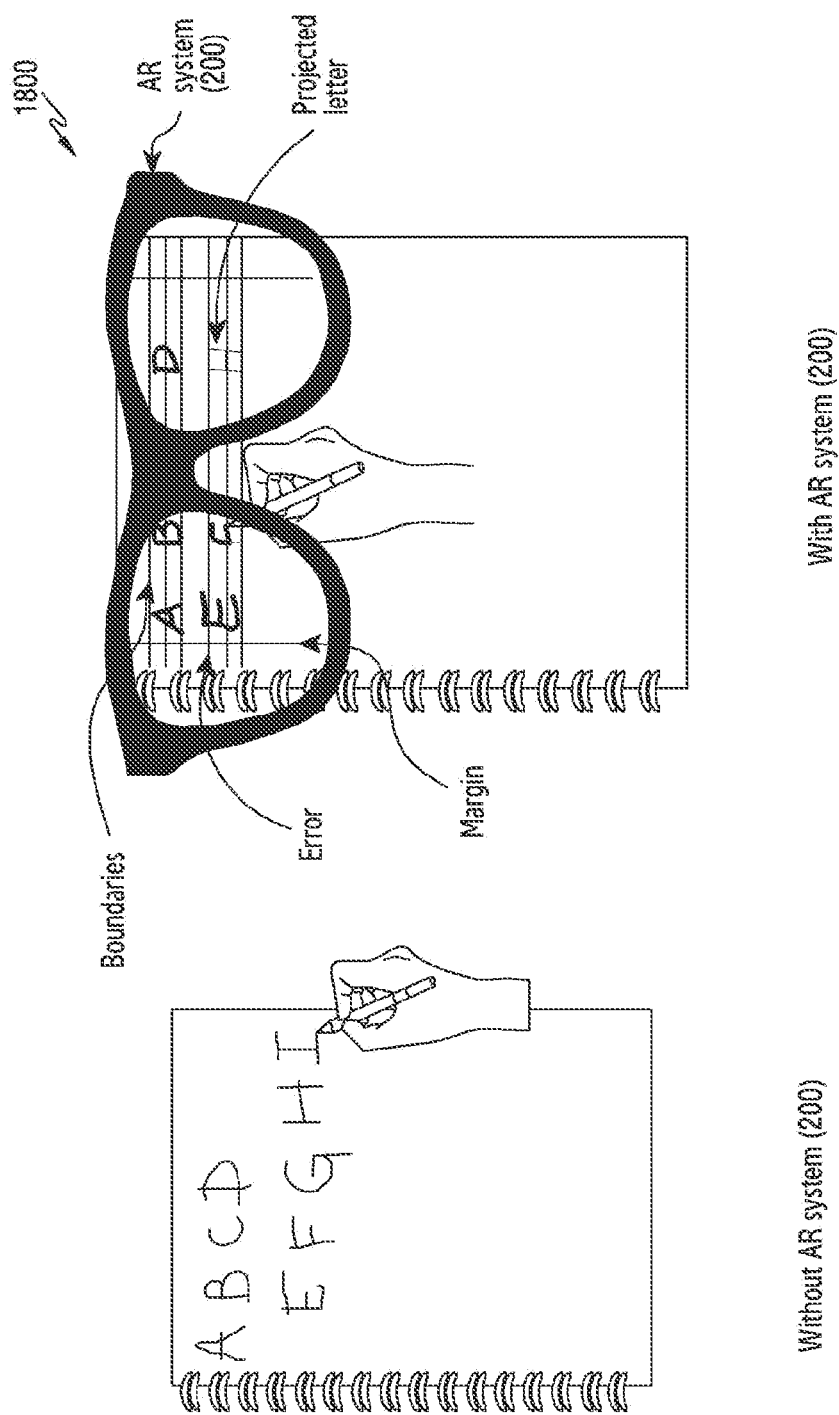
FIG. 18 is a pictorial representation illustrating a technique of providing writing assistance to a user through virtual gridlines and margins in accordance with an embodiment of the present disclosure.

Referring now to FIG. 18, a technique of providing writing assistance to a user through virtual gridlines and margins is depicted in accordance with an embodiment of the present disclosure.

The AR system (200) captures an image of the information written by the user (not shown) by way of the input unit (204). The text recognition unit (206) processes the image to identify the text written by the user. The natural language processing unit (208) determines that the user is practicing writing English alphabets. The natural language processing unit (208) determines that the assistive information to be displayed to the user should be in form of gridlines such as virtual boundaries or virtual margins to assist the user in writing the alphabets.

The natural language processing unit (208) also determines error in the alphabets written by the user. Here, the natural language processing unit (208) determines that the alphabet "E" written by the user is misaligned or it crosses the virtual boundaries.

The natural language processing unit (208) also predicts the next letter in the series, i.e., the letter "H". The predicted letter is displayed to the user as an assistive information. Here, the letter "H" is projected virtually by the AR system (200). The user may trace the projected letter "H" to write on the surface.

Figure 19:
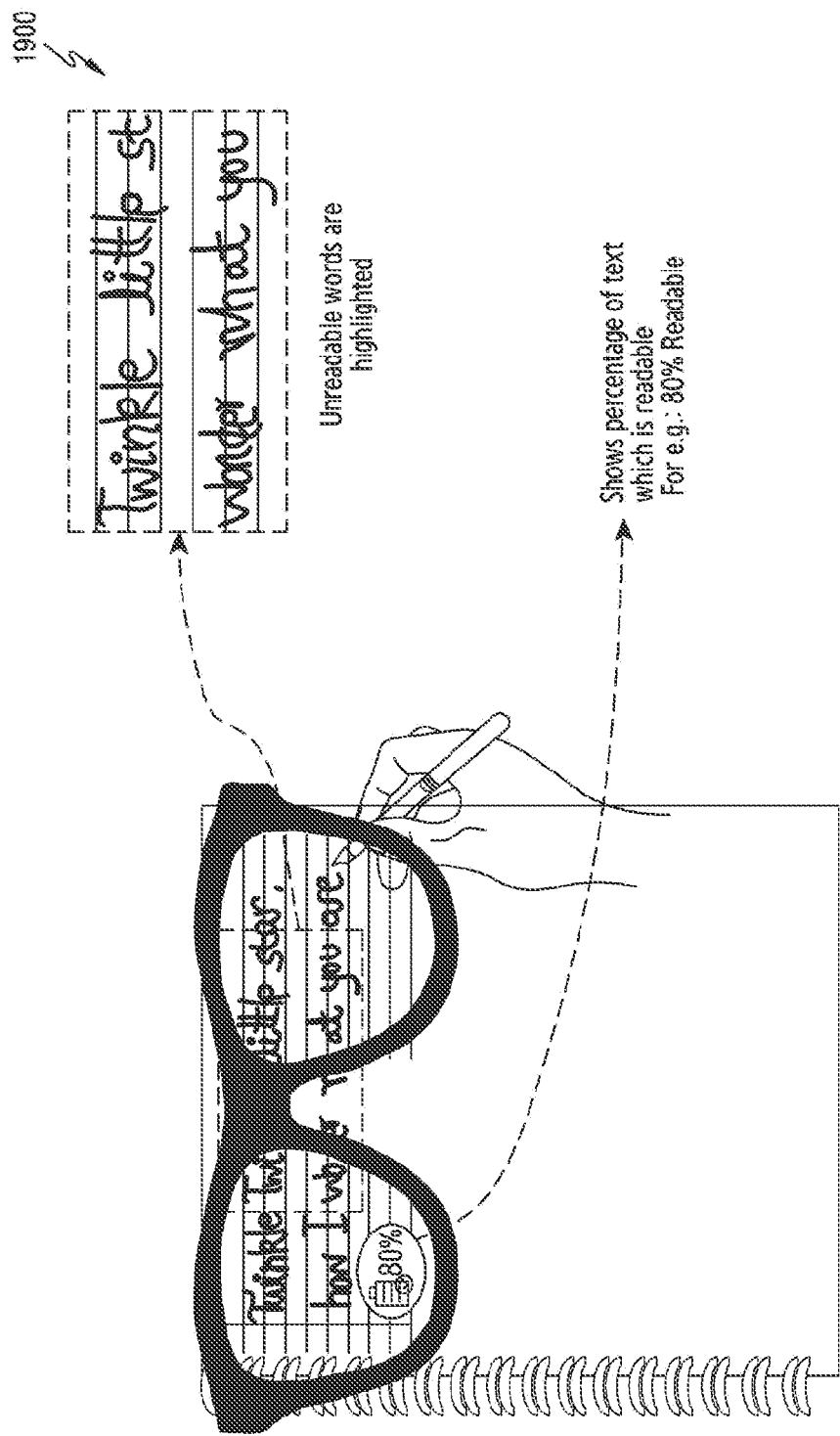
FIG. 19 is a pictorial representation illustrating a technique of displaying readability metric to the user in accordance with an embodiment of the present disclosure.

Referring now to FIG. 19, a technique of displaying readability metric to the user is depicted in accordance with an embodiment of the present disclosure.

The AR system (200) captures an image of the information written by the user (not shown) by way of the input unit (204). The text recognition unit (206) processes the image to identify the text written by the user. The processing unit (202) determines an extent of readability of the user's handwritten text and generates the assistive information indicative of a percentage of readability of the user's handwriting. The assistive information is displayed to the user in form of percentage of readability.

Further, the processing unit (202) determines whether the written words are legible or not. The AR system (200) highlights the words that are not legible.

Referring now to FIGS. 20 and 21, a technique of displaying word recommendation and error correction simultaneously to a user is depicted in accordance with an embodiment of the present disclosure.

In FIG. 21, the surface on which the information is displayed is a digital screen of a user device (not shown), such as a smartphone screen. The AR system (200) is in communication with the user device. The AR system (200) projects an interactive assistive information over the digital screen of the user device. The user device receives a user input from the user and transmits the user input to the AR system (200). The AR system (200) receives the user input from the user in device.

As depicted in FIG. 21, the user input is indicative of whether the user wishes to automatically correct the error or not. If the user input is positive, the AR system (200) automatically corrects the errors. If the user input is negative, the AR system (200) does not correct the errors in the text typed or written by the user. Hence, the AR system (200) dynamically modifies the assistive information based on the user input in response to the displayed interactive assistive information.

Figure 22A:
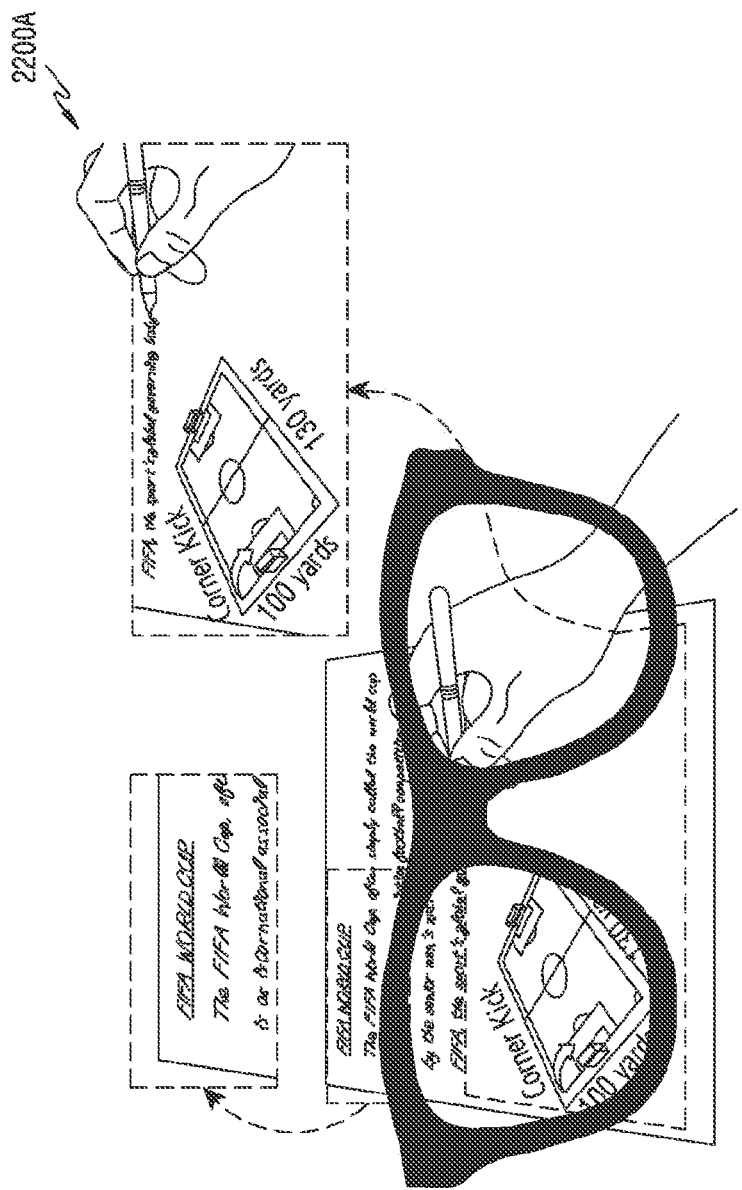
FIGS. 22A-22B are pictorial representations illustrating a technique of displaying three-dimensional (3D) assistive information in accordance with an embodiment of the present disclosure.
Figure 22B:
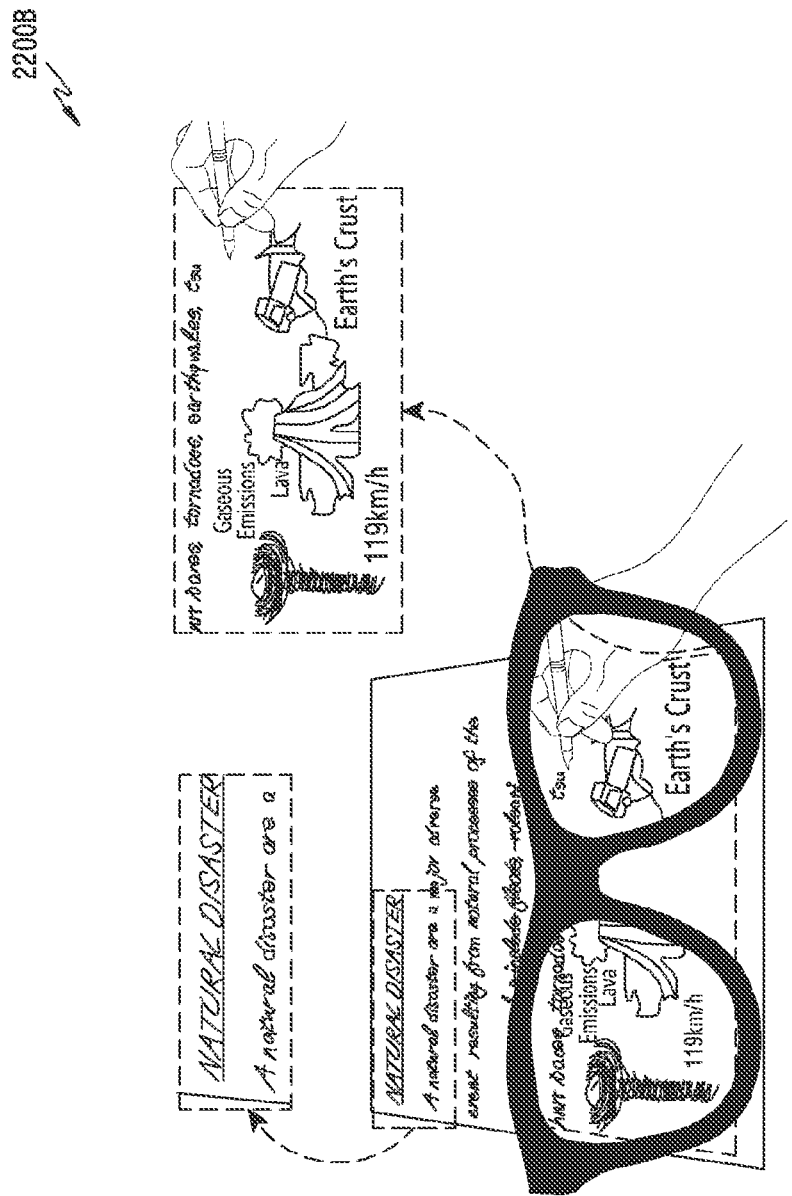

Referring now to FIGS. 22A-22B, a technique of displaying 3D assistive information is depicted in accordance with an embodiment of the present disclosure.

The AR system (200) determines the context of the text which is being written by the user. In an example, the context of the text is determined specifically as per sentences or words what are being written by the user. Hence, the assistive content is determined dynamically as per the words or the sentences written by the user.

In an example depicted in FIG. 22A, the user is writing information about football game and the dimensions of the football field. Therefore, the AR system (200) determines the context to be "football field". Accordingly, the AR system (200) presents visual hints having a 3D model of a football ground with players therein. The 3D football field depicts details like dimensions of football field (100 yards× 130 yards) and corner kick.

In another example depicted FIG. 22B, the user is writing an essay on natural disasters. When the user writes the word "hurricane", the AR system (200) displays a 3D hurricane having high speed such as 119 km/h which is a natural disaster. When the user writes "earthquakes", the AR system (200) displays an earthquake caused by lava and gaseous emissions erupting from a volcano and also displays an image of earth's crust which causes the earthquake.

As depicted in FIGS. 22A-22B, the 3D assistive is accompanied by textual explanatory words such as speed of hurricane, lava, gaseous emissions, earth's crust etc. This facilitates quick and easy understanding of the user.

Figure 23A:
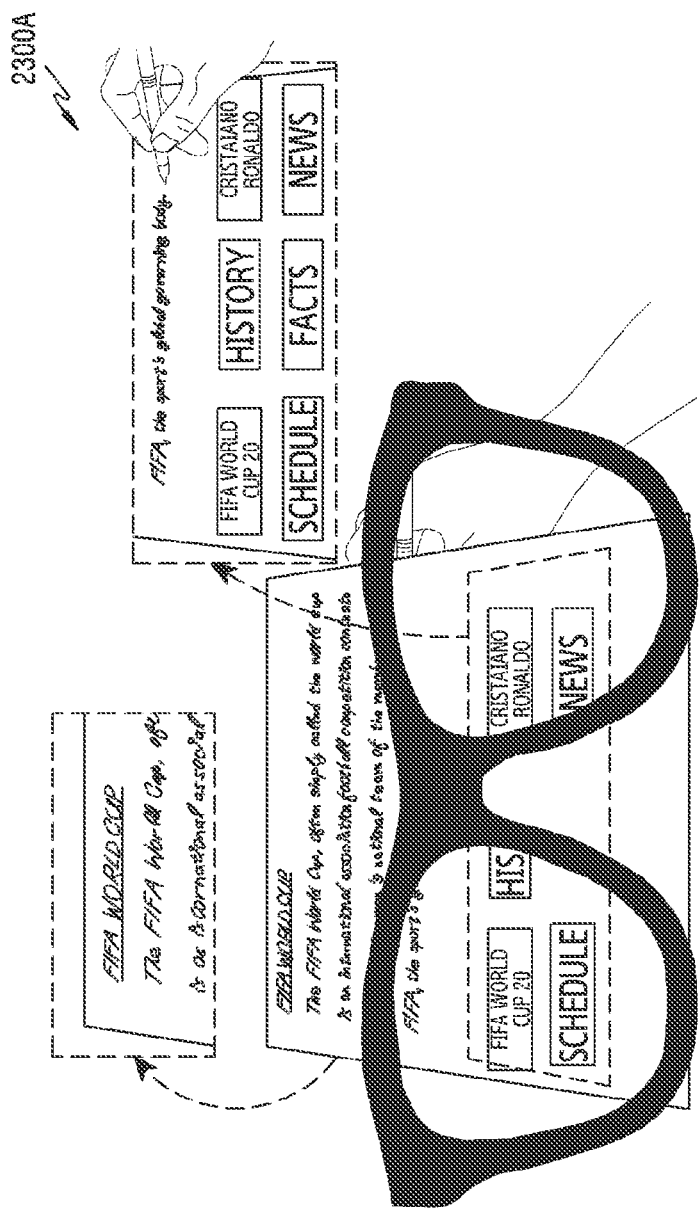
FIGS. 23A-23B are pictorial representations illustrating a technique of displaying interactive assistive information in accordance with an embodiment of the present disclosure.
Figure 23B:
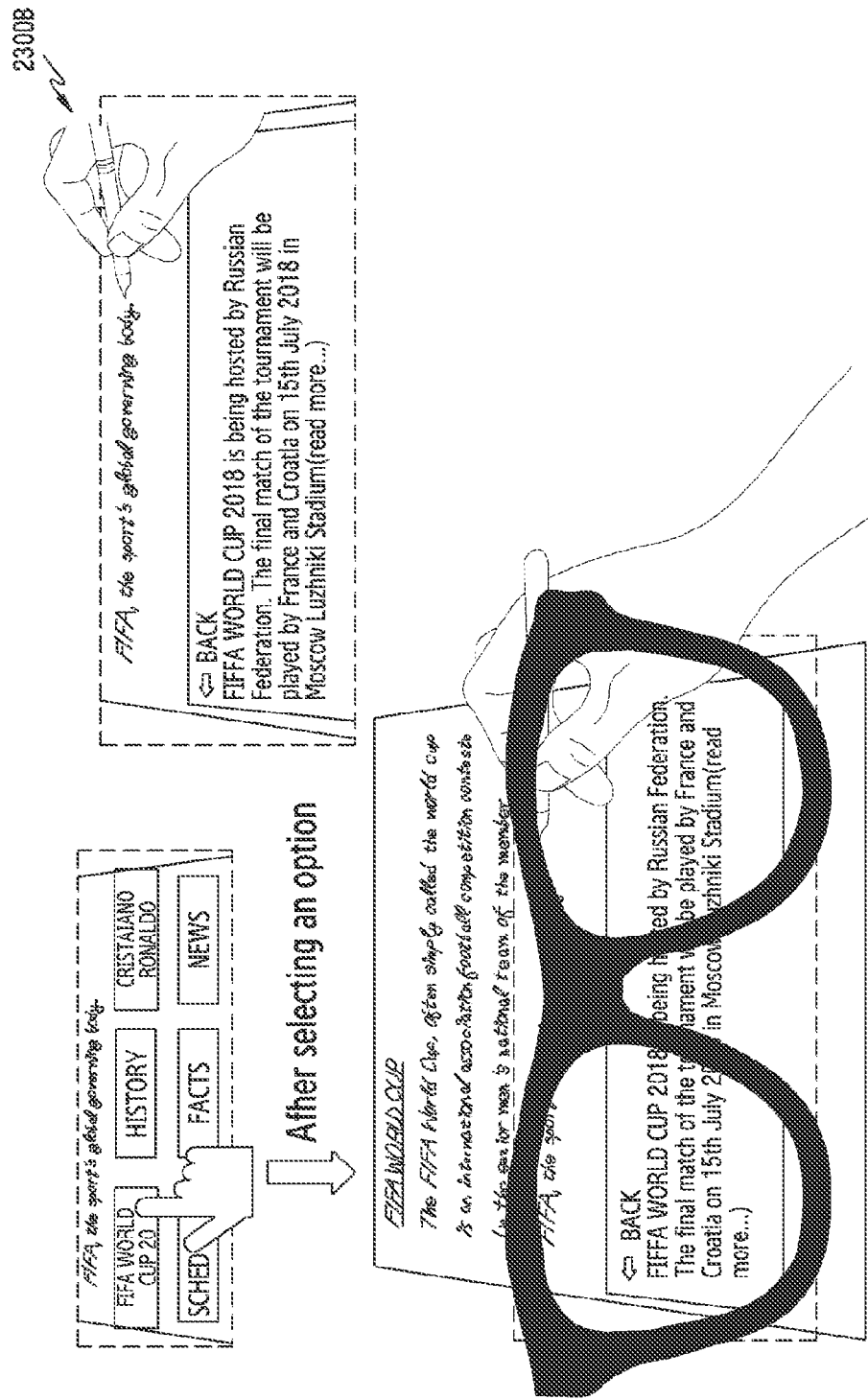

Referring now to FIGS. 23A-23B, a technique of displaying interactive assistive information is depicted in accordance with an embodiment of the present disclosure.

When the user starts writing, the AR system (200) determines the context of the text written by the user. Here, the AR system (200) determines the context as"football" or "FIFA". Thereafter, the AR system (200) fetches the data related to football from internet and presents to the user. The AR system (200) categorizes the assistive information into different categories or sub-topics for better ease of the user. When the user chooses a sub-topic, assistive information related to the sub-topic is displayed. When the user chooses 'FIFA World Cup 2018", assistive information relating to the world cup is shown and corresponding words are recommended to the user.

It should be noted that the description merely illustrates the principles of the present disclosure. It will thus be appreciated that those skilled in the art will be able to devise various arrangements that, although not explicitly described herein, embody the principles of the present disclosure.

Furthermore, all examples recited herein are principally intended expressly to be only for explanatory purposes to help the reader in understanding the principles of the invention and the concepts contributed by the inventor(s) to furthering the art and are to be construed as being without limitation to such specifically recited examples and conditions.

Moreover, all statements herein reciting principles, aspects, and embodiments of the invention, as well as specific examples thereof, are intended to encompass equivalents thereof.

The invention claimed is:

1. An electronic device in an augmented reality system, the electronic device comprising:
   an inputter;
   an outputter;
   at least one processor; and
   a memory storing instructions which, when executed by the at least one processor, cause the at least one processor to:
   control the inputter to capture an image,
   identify, from the image, information on a surface depicted in the image,
   based on the information on the surface depicted in the image, generate input data and determine a context of the input data,
   based on the context, generate at least one piece of assistive information,
   determine one or more spatial attributes based on the image, the one or more spatial attributes comprising an angle between the augmented reality system and the surface depicted in the image,
   set a type of plane for the at least one piece of assistive information based on a result of comparing the angle with a threshold angle,
   generate positioning information based on the one or more spatial attributes, and
   control the outputter to display the at least one piece of assistive information based on the positioning information and the set type of plane.

2. The electronic device of claim 1, wherein the one or more spatial attributes further comprises at least one of:
   a distance between the augmented reality system and the surface depicted in the image, or
   an obstruction in a field of view between the augmented reality system and the surface depicted in the image.

3. The electronic device of claim 2, wherein the instructions, when executed by the at least one processor, further cause the at least one processor to:
   determine a position based on the distance, the angle, and the set type of plane,
   determine a style based on at least one of the at least one piece of assistive information, the distance, the angle, a background of the information, or a predefined style preference, and
   generate the positioning information indicative of at least one of the set type of plane, the position, or the style.

4. The electronic device of claim 1, wherein the instructions, when executed by the at least one processor, further cause the at least one processor to:
   determine a type of the at least one piece of assistive information based on the context of the input data,
   determine content of the at least one piece of assistive information based on the context of the input data, and
   generate the at least one piece of assistive information to comprise the type and the content.

5. The electronic device of claim 1, wherein the augmented reality system comprises at least one of a head-mounted device or a hand-held device.

6. The electronic device of claim 1, wherein the surface depicted in the image comprises a non-digital writing surface.

7. The electronic device of claim 1, wherein the surface depicted in the image comprises a digital display of a user equipment.

8. The electronic device of claim 1, wherein the instructions, when executed by the at least one processor, further causes the at least one processor to:
   detect a style of handwriting of the information, and
   reconstruct the style of handwriting.

9. The electronic device of claim 1, wherein the augmented reality system comprises a user gesture detector configured to:
   detect one or more user gestures indicative of an interaction with the at least one piece of assistive information or with the information on the surface depicted in the image, and
   display updated assistive information based on the one or more user gestures.

10. The electronic device of claim 1, wherein the information comprises at least one of handwritten information, printed information, electronically displayed information, or virtually projected information.

11. A method performed by an electronic device in an augmented reality system, the method comprising:
    capturing an image;
    identifying information on a surface depicted in the image;
    based on the information on the surface depicted in the image, generating input data and determining a context of the input data;
    generating at least one piece of assistive information based on the context;

determining one or more spatial attributes based on the image, the one or more spatial attributes comprising an angle between the augmented reality system and the surface depicted in the image;

setting a type of plane for the at least one piece of assistive information based on a result of comparing the angle with a threshold angle;

generating positioning information based on the one or more spatial attributes, the positioning information indicating a position determined based on at least a distance between the augmented reality system and the surface depicted in the image; and displaying the at least one piece of assistive information based on the positioning information and the set type of plane.

12. The method of claim 11, wherein the one or more spatial attributes further comprise at least one of:

a distance between the augmented reality system and the surface depicted in the image; or an obstruction in a field of view between the augmented reality system and the surface depicted in the image.

13. The method of claim 12, further comprising:

determining a position based on the distance, the angle, and the set type of plane;

determining a style based on at least one of the at least one piece of assistive information, the distance, the angle, a background of the information, or a predefined style preference; and generating the positioning information indicative of at least one of the set type of plane, the position, or the style.

14. The method of claim 11, further comprising:

determining a type of the at least one piece of assistive information based on the context of the input data;

determining a content of the at least one piece of assistive information based on the context of the input data; and generating the at least one piece of assistive information to comprise the type and the content.

15. The method of claim 11, further comprising:

detecting a style of handwriting of the information;

reconstructing the style of handwriting; and displaying the at least one piece of assistive information in a form of the style of handwriting.

16. The method of claim 11, wherein the information comprises at least one of handwritten information, printed information, electronically displayed information, or virtually projected information.

17. The method of claim 11, wherein the surface depicted in the image comprises a non-digital writing surface.

18. The method of claim 11, wherein the surface depicted in the image comprises a digital display of a user equipment.

19. The method of claim 11, further comprising:

detecting one or more user gestures indicative of an interaction with the at least one piece of assistive information or with the information on the surface depicted in the image, and displaying updated assistive information based on the one or more user gestures.

20. The method of claim 11, wherein the setting of the type of plane comprises setting at least one of a three dimensional (3D) plane or a two dimensional (2D) plane based on the result of the comparing.

* * * * *